(12) United States Patent
Duvert et al.

(10) Patent No.: US 12,478,525 B2
(45) Date of Patent: Nov. 25, 2025

(54) INFLATABLE PERSON SUPPORT STRAPS

(71) Applicant: LIKO RESEARCH & DEVELOPMENT AB, Luleå (SE)

(72) Inventors: Jean-Bernard Duvert, Baud (FR); Philippe Kaikenger, Pluvigner (FR)

(73) Assignee: LIKO RESEARCH & DEVELOPMENT AB, Luleå (SE)

( * ) Notice: Subject to any disclaimer, the term of this patent is extended or adjusted under 35 U.S.C. 154(b) by 25 days.

(21) Appl. No.: 18/690,322

(22) PCT Filed: Sep. 10, 2021

(86) PCT No.: PCT/IB2021/000636
§ 371 (c)(1),
(2) Date: Mar. 8, 2024

(87) PCT Pub. No.: WO2023/037134
PCT Pub. Date: Mar. 16, 2023

(65) Prior Publication Data
US 2024/0374446 A1    Nov. 14, 2024

(51) Int. Cl.
*A61G 7/00* (2006.01)
*A61G 7/10* (2006.01)

(52) U.S. Cl.
CPC ........... *A61G 7/001* (2013.01); *A61G 7/1021* (2013.01); *A61G 2200/32* (2013.01)

(58) Field of Classification Search
None
See application file for complete search history.

(56) References Cited

U.S. PATENT DOCUMENTS

| | | | | |
|---|---|---|---|---|
| 5,054,854 A | * | 10/1991 | Pruit | A47C 7/383 |
| | | | | 297/284.6 |
| 6,331,170 B1 | * | 12/2001 | Ordway | A61F 5/028 |
| | | | | 602/19 |
| 10,258,527 B2 | | 4/2019 | Rodriguez | |
| 2005/0055769 A1 | | 3/2005 | Taylor | |
| 2006/0185078 A1 | | 8/2006 | Perry | |
| 2018/0116883 A1 | | 5/2018 | Yen | |
| 2018/0280219 A1 | | 10/2018 | Garrett et al. | |
| 2018/0311097 A1 | | 11/2018 | Rodzewicz et al. | |
| 2020/0138656 A1 | | 5/2020 | Davis | |

FOREIGN PATENT DOCUMENTS

| | | |
|---|---|---|
| CN | 206355262 U | 7/2017 |
| CN | 110279177 A | 9/2019 |
| WO | 2016037108 A1 | 3/2016 |
| WO | 2018055362 A2 | 3/2018 |

OTHER PUBLICATIONS

Prevalon® Mobile Air Transfer System, stryker 2019, 20 pages.
International Search Report and Written Opinion for Appln. No. PCT/IB2021/000636 mailed Dec. 5, 2022, 10 pages.

* cited by examiner

*Primary Examiner* — Adam C Ortiz
(74) *Attorney, Agent, or Firm* — Dinsmore & Shohl LLP

(57) ABSTRACT

An inflatable support strap for positioning and rotating a horizontally laying subject on a support surface, the inflatable support strap includes an elongate body comprising a first end and a second end spaced a distance apart from the first end, the first end and the second end each comprising at least one loop extending therefrom, and the elongate body defining a cavity. The inflatable support strap also includes one or more bladders disposed within the cavity, the one or more bladders configured to be selectively inflated or deflated.

20 Claims, 10 Drawing Sheets

INFLATABLE PERSON SUPPORT STRAPS

CROSS-REFERENCE TO RELATED APPLICATIONS

This application is a U.S. National Phase of International Application No. PCT/IB2021/000636, entitled "INFLATABLE PERSON SUPPORT STRAPS" and filed Sep. 10, 2021, which is incorporated herein by reference in its entirety.

BACKGROUND

Field

The present specification generally relates to apparatuses used for the purposes of moving and/or supporting a subject and, more specifically, to person support straps usable to prone a subject.

Technical Background

Subjects that are supported by a surface for long periods of time can develop injuries (e.g., pressure ulcers) if contact between the subject's body and the surface is not periodically adjusted. One means of adjusting contact is rotating the subject from a prone position to a supine position, and vice versa. In addition, rotating the subject from a prone position to a supine position, and vice versa, may be necessary for treating various diseases and conditions that affect the respiratory system, including, but not limited to, acute respiratory distress syndrome (ARDS), coronavirus disease (COVID-19), and the like. However, some subjects cannot move between positions because of, for example, unconsciousness of the subject, physical deformity of the subject, size of the subject, and/or the like.

Medical personnel typically use various techniques to rotate a subject from a prone position to a supine position and vice versa, such as, for example, utilizing bed sheets, pushing and pulling on the subject, and the like. However, such techniques may require a large number of medical personnel and may result in injury to or incorrect positioning of the subject, injury to the medical personnel, and the like. Alternatively, medical personnel may use apparatuses, such as slings or the like, to rotate subjects. However, slings typically are not left in place under a subject, as the slings may be reused and/or may result in skin injuries if left in place. In addition, slings typically provide no further benefit to the subject after the subject has been rotated. Further, positioning of the subject either before or after rotation may involve some discomfort and the subject may desire adjustments to alleviate such discomfort.

SUMMARY

In an aspect, an inflatable support strap for positioning and rotating a horizontally laying subject on a support surface, the inflatable support strap includes an elongate body comprising a first end and a second end spaced a distance apart from the first end, the first end and the second end each comprising at least one loop extending therefrom, and the elongate body defining a cavity. The inflatable support strap also includes one or more bladders disposed within the cavity, the one or more bladders configured to be selectively inflated or deflated. In some aspects, each of the one or more bladders comprises at least one valve fluidly coupled to an interior of the one or more bladders. In some aspects, each of the one or more bladders comprises one or more welded portions that define a plurality of cavities within the one or more bladders that are individually inflatable. In some aspects, the elongate body further comprises one or more welded portions corresponding to the one or more welded portions of the one or more bladders that define the plurality of cavities within the one or more bladders. In some aspects, each of the one or more bladders further comprises a laterally extending welded portion for reducing curvature of the one or more bladders. In some aspects, the elongate body further comprises a laterally extending welded portion corresponding to the laterally extending welded portion of the one or more bladders for reducing curvature of the elongate body. In some aspects, the one or more bladders further comprises a plurality of welded points for reducing curvature of the one or more bladders. In some aspects, the elongate body comprises a plurality of welded points corresponding to the plurality of welded points of the one or more bladders for reducing curvature of the elongate body. In some aspects, each of the one or more bladders comprises at least one fastener for securing the one or more bladders to the elongate body. In some aspects, the one or more bladders further comprises indicia indicating an arrangement of the one or more bladders with respect to the elongate body. In some aspects, the cavity of the elongate body comprises an opening for receiving the one or more bladders therein and a fastener for sealing the cavity. In some aspects, the elongate body further comprises at least one slot configured to receive one or more valves of the one or more bladders when positioned within the cavity. In some aspects, the elongate body further comprises a high-friction material. In some aspects, the elongate body further comprises a low-friction material. In some aspects, the at least one loop comprises a long loop and a short loop, the long loop being longer in overall length than the short loop. In some aspects, the elongate body further comprises one or more first cut out portions at the first end of the inflatable support strap and one or more second cut out portions at the second end of the inflatable support strap, the one or more first cut out portions and the one or more second cut out portions reinforced and providing a grasping point for positioning the inflatable support strap with respect to the subject. In some aspects, the elongate body further comprises indicia disposed on an outer surface thereof. In some aspects, the indicia indicates an image of one or more anatomical features to aid in alignment with corresponding anatomical features of the subject. In some aspects, the one or more anatomical features comprise one or more features of a subject chest. In some aspects, the one or more anatomical features comprise one or more features of a subject hip. In some aspects, the indicia indicates a centerline of the elongate body.

In another aspect, a system for rotating a horizontally laying subject on a support surface includes the inflatable support strap according to any previous aspect. In some aspects, the system further includes a second inflatable support strap. In some aspects, the system further includes an overhead lift.

In another aspect, a kit of parts includes the inflatable support strap according to any previous aspect and one or more instructions for positioning the inflatable support strap with respect to a subject. In some aspects, the kit of parts further includes a second inflatable support strap, and one or more instructions for positioning the inflatable support strap with respect to the subject.

In another aspect, a kit of parts includes the inflatable support strap according to any previous aspect and one or more instructions for inserting and arranging the one or more bladders within the cavity of the inflatable support strap. In some aspects, the kit of parts further includes a pump, and one or more instructions for inflating the inflatable support strap.

In another aspect, a method of rotating a horizontally laying subject on a support surface includes determining a direction of rotation from a first orientation, arranging at least one inflatable support strap to extend in a lateral direction underneath the subject, the inflatable support strap comprising a first end extending laterally toward the direction of rotation and a second end extending laterally toward a direction opposite the direction of rotation, the second end comprising at least one loop, raising the second end, wherein the subject rotates towards the direction of rotation, repositioning the subject with respect to the support surface when the subject has rotated to a lateral recumbent position, continue raising the second end, thereby causing the subject to continue rotating to a second orientation that is 180° from the first orientation, and inflating one or more cavities of one or more bladders to reduce contact between the subject and the support surface. In some aspects, the method further includes, before arranging, inserting one or more bladders into a cavity of a support strap to form the inflatable support strap. In some aspects, the method further includes deflating a cavity of the one or more bladders to provide a slight rotation to the subject. In some aspects, the method further includes inflating a cavity of at least one bladder to provide a slight rotation to the subject. In some aspects, an overhead lift raises the second end to cause the subject to rotate from the first orientation to the second orientation.

Additional features and advantages of the aspects described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
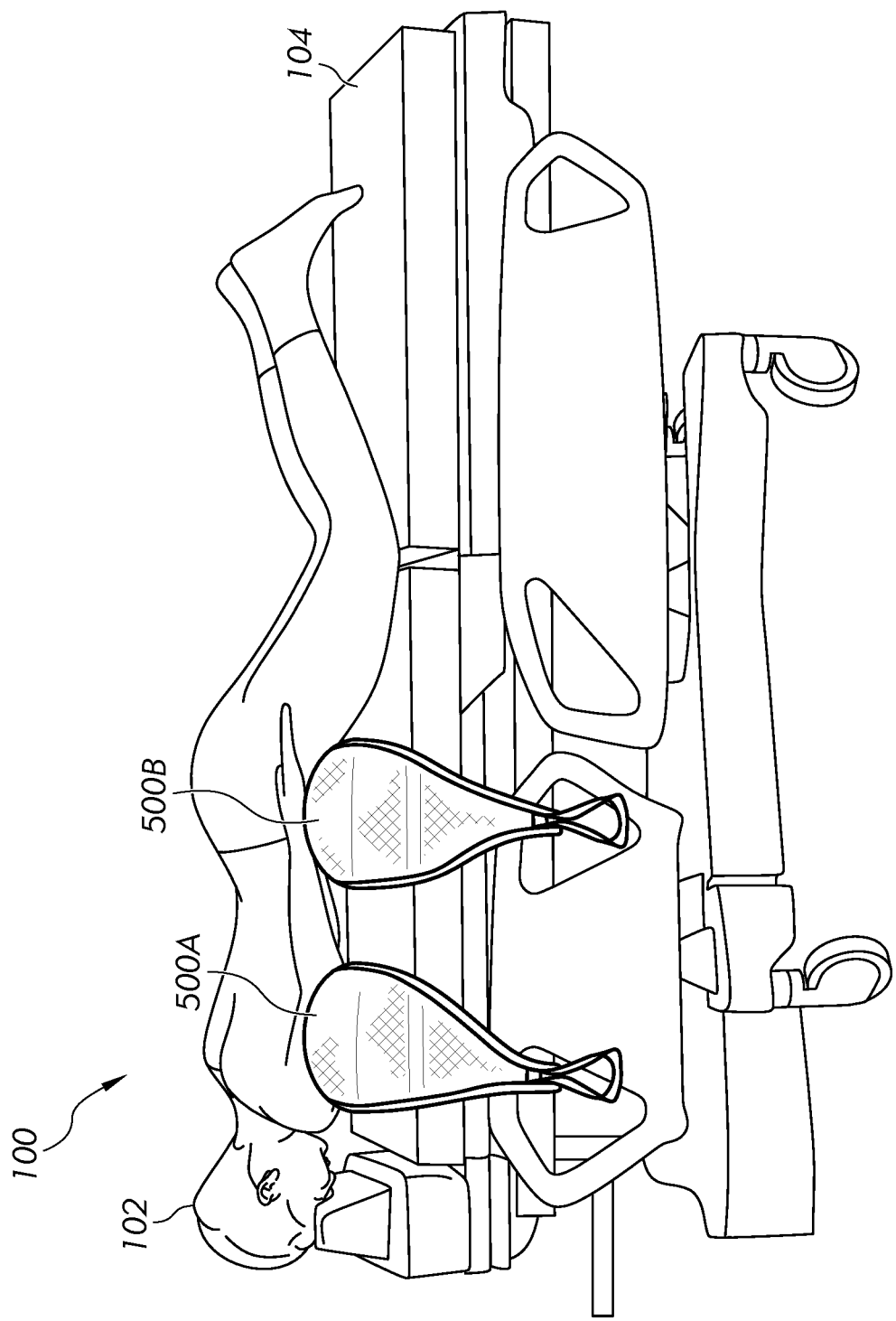
FIG. 1 schematically depicts an illustrative scene of a subject in a prone position supported on a plurality of support straps, according to one or more embodiments shown and described herein.

Reference will now be made in detail to various inflatable support straps that may contain an inflatable bladder for rotating a subject, such as from a prone position to a supine position and/or from a supine position to a prone position, and/or for adjusting the subject's position without having to rotate the subject, such as by inflating the inflatable support straps to reduce the contact surface area between the subject and the support surface (e.g., a bed) on which the subject is resting. Whenever possible, the same reference numerals will be used throughout the drawings to refer to the same or like parts.

One embodiment of inflatable support straps for carrying out the various methods described herein is depicted in FIG. 1, in which the inflatable support straps are shown on a hospital bed with a subject resting on the inflated support straps. Various forms of bladders that may be used with inflatable support straps are depicted in FIGS. 2A-2C, 3A-3C, and 4A-4C. Various forms of bodies that may be used with inflatable support straps are depicted in FIGS. 5A-5E. A method for rotating a subject and adjusting the position of the subject is depicted in FIG. 6, the steps of which are illustrated in FIGS. 7A-7F.

As will be evident from the present disclosure, the inflatable support straps described herein allow for personnel to rotate a horizontally laying subject from a prone position to a supine position (e.g., a 180° rotation) and/or from a supine position to a prone position (e.g., a 180° rotation) and to adjust the position of the subject without having to perform another rotation. Adjusting the position of the subject may include elevating the subject by inflating one or more bladders of the inflatable support straps to reduce contact surface area between the subject and the support surface. Adjusting the position of the subject may also include selectively inflating or deflating one or more bladders of the inflatable support straps to provide the subject a slight lateral rotation to modify the distribution of pressure on the subject, thereby alleviating discomfort the subject may be facing. As such, a technical feature achieved by the apparatuses, methods, and kits described herein is the ability to provide clearance between the subject and the support surface as well as to relieve potential discomfort experienced by the subject during extended periods without rotation. Other advantages of the methods described herein will be apparent upon a reading of the present disclosure.

Referring now to FIG. 1, an illustrative scene 100 of a subject 102 in a prone position on a plurality of inflatable support straps 500a, 500b is depicted. In some embodiments, the inflatable support straps 500a, 500b may be placed under the chest and waist of subject 102 to reduce pressure on sensitive areas of the subject 102, such as the stomach when the inflatable support straps 500a, 500b are inflated. However, other positions of the inflatable support straps 500a, 500b are contemplated and included within the scope of the present disclosure. Other equipment may be utilized as necessary to reduce any potential discomfort. For example, a headrest may be used to reduce potential neck strain when the inflatable support straps 500a, 500b are inflated, as shown. It should be understood that the placement of the inflatable support straps 500a, 500b is not limited to the areas shown in FIG. 1. Additionally, it should be understood that the use of inflatable support straps is not limited to two inflatable support straps, as shown in FIG. 1, but may include any number of inflatable support straps, such as, for example, one inflatable support strap, three inflatable support straps, four inflatable support straps, or greater than four inflatable support straps. In some embodiments, the inflatable support straps may be in the form of an inflatable sheet that supports at least a majority of the subject's body.

Rotating the subject 102 with the inflatable support straps 500a, 500b may be performed manually or mechanically. Rotating the subject 102 may be performed manually by a plurality of individuals (e.g., individuals for raising a side of the inflatable support straps 500a, 500b, and/or other individuals as necessary for repositioning the subject 102 during the rotation, ensuring that items connected to the subject 102 are correctly positioned, monitoring the positioning of the subject's 102 head, and the like). Additionally or alternatively, rotating the subject 102 may be performed mechanically by using an overhead lift system such as the Liko-Guard™, Likorall™, Multirall™, or UltraTwin™ by Hillrom™ (Batesville, Indiana USA) that may be coupled to a plurality of loops of the inflatable support straps 500a, 500b to assist in the rotation of the subject 102.

The support surface 104 is generally an apparatus for supporting the subject 102 thereon. For example, the support surface 104 may be a hospital bed, a stretcher, a surgical table, a gurney, a chair, a sofa, or similar support apparatuses commonly found in hospitals, nursing homes, rehabilitation centers, and the like.

Figure 2A:
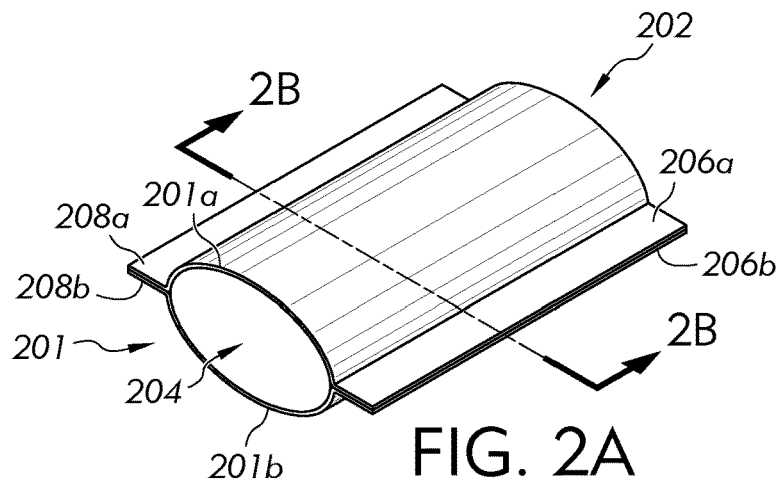
FIG. 2A schematically depicts an illustrative bladder, according to one or more embodiments shown and described herein.
Figure 2B:
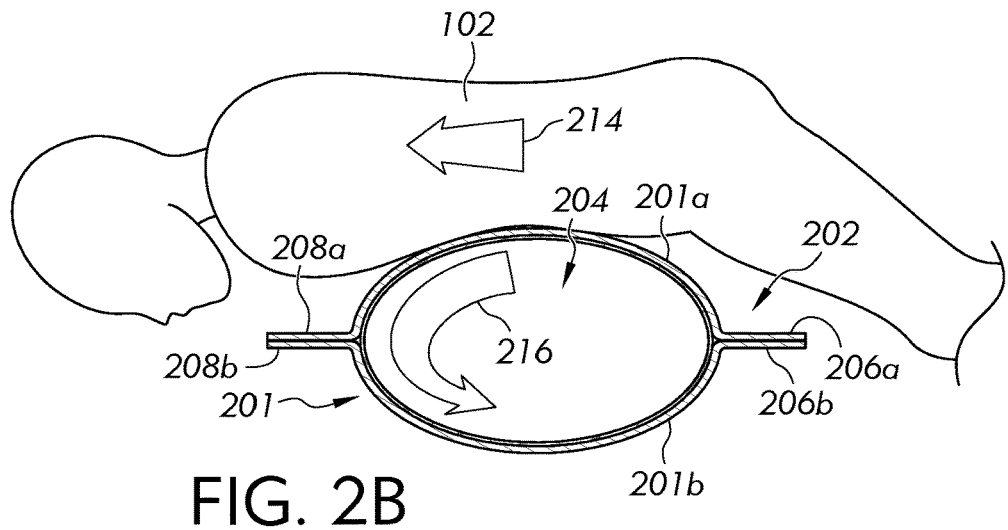
FIG. 2B schematically depicts a cross-section of the bladder of FIG. 2A, taken along line 2B-2B, when supporting a subject, according to one or more embodiments described herein.
Figure 2C:
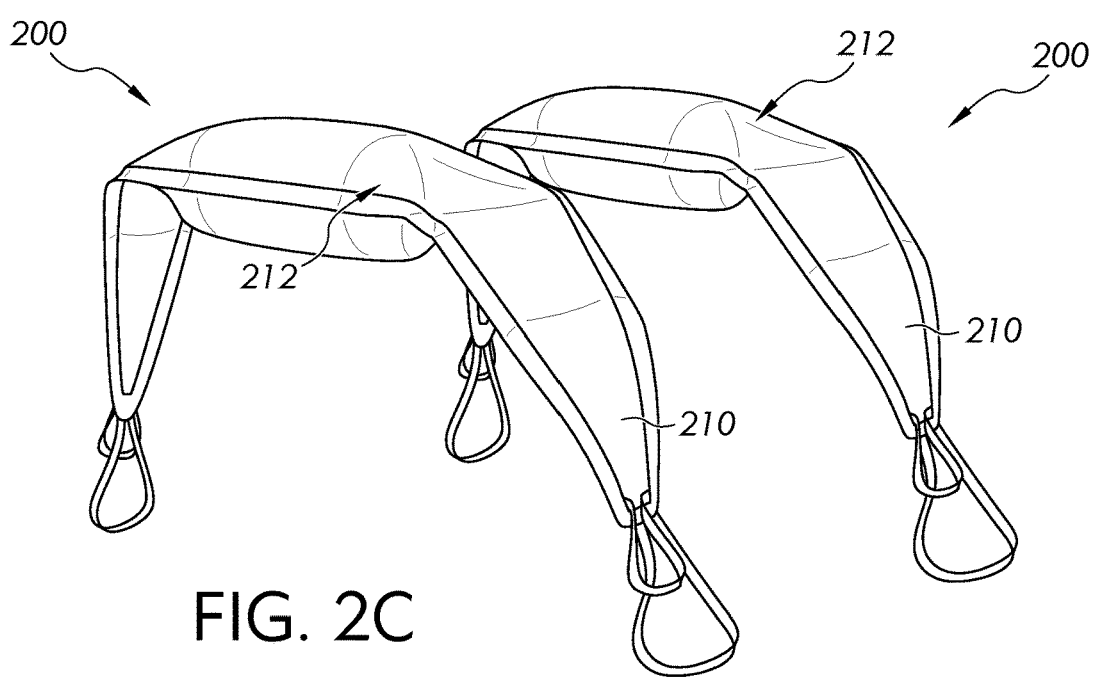
FIG. 2C schematically depicts a pair of illustrative support straps, each having the bladder of FIG. 2A integrated therewith, according to one or more embodiments described herein.

FIGS. 2A-2C depict various illustrative features of a bladder 202 that may be placed within an interior of an inflatable support strap 200 for the purposes of inflation thereof.

Referring now to FIG. 2A, an illustrative bladder 202 is schematically depicted. FIG. 2A depicts the bladder 202 in an isometric perspective that truncates the ends of the bladder 202 for illustrative purposes. The bladder 202 may be formed by any pliant material capable of holding a fluid (e.g., air). Such materials may include, for example, any PVC or polyurethane coated fibrous material, rubber, or the like. The bladder 202 may be monolithically formed (e.g., formed from a single piece of material) or may be formed from a plurality of pieces of material. The materials may be welded, glued, stitched, or otherwise affixed to each other by any means for joining pieces of material together to form a hermetic seal that defines at least one cavity 204 therein.

As depicted in FIG. 2A, the bladder 202 includes the body 201 formed from a first component 201a and a second component 201b that are joined together. For example, the first component 201a may be a single material including a first end 206a and a second end 208a. Similarly, the second component 201b may be a single material including a first end 206b and a second end 208b. In some embodiments, the first component 201a and the second component 201b may be joined together at first ends 206a, 206b, and also at second ends 208a, 208b thereof to form the cavity 204 between the ends 206a, 206b and 208a, 208b. In some embodiments, portions of the body 201 of the bladder 202 may also be joined together in one or more other areas to form a plurality of cavities, niches, and/or the like. It should be understood that FIG. 2A is truncated to expose the cavity 204 and that portions of the body 201 may otherwise be joined together to form and seal the cavity 204. While not depicted in FIGS. 2A-2C, the body 201 may include one or more inlets, outlets, vents, valves, and/or the like that provide access to the cavity 204 for the purposes of inflating the bladder 202 (e.g., dispensing a fluid within the cavity 204 thereof), deflating the bladder 202 (e.g., venting a fluid within the cavity 204 thereof), and/or the like.

Referring now to FIG. 2B, a cross-section of the bladder 202 disposed within an inflatable support strap 200 supporting the subject 102 is schematically depicted. The bladder 202 is inflated such that the subject 102 maintains no upper body contact with the support surface 104. The bladder 202 may be inflated or deflated as needed to improve comfort and/or stability of the subject 102, to prepare the bladder 202 for storage, or any other reason. The design of the bladder 202 may be desirable for ease of manufacturing because few points of the bladder are joined together (e.g., ends 206a, 206b and 208a, 208b), which reduces the number of steps in the manufacturing process.

However, the design of the bladder 202 may not be desirable for stability of the subject 102. As shown in FIG. 2B, the shape of the bladder 202 is generally oval shaped, and the roundness of the bladder 202 may cause the subject to move in directions indicated by arrows on the subject 102. If a force causes the subject 102 to move in a first direction 214 tangent to the bladder 202, the rounded shape of the bladder 202 may cause the bladder 202 to rotate in a corresponding first rotational direction 216 and cause further movement of the subject 102, including movement that may be undesirable. For example, the force may be applied by a caregiver moving the subject 102. As another example, the force may be applied by gravity based on the position the subject is in, such as the Trendelenburg or reverse Trendelenburg position. The reduced stability and facilitated movement of the subject 102 may impact the operations performed on the subject 102. For example, if the subject 102 is intubated, movement of the subject 102 may place the subject 102 at risk of unintended extubation. In another example, the subject 102 may fall off a support surface such as a bed or the like It should be understood that only the bladder 202 is shown between the subject 102 and the support surface 104 without the body of the inflatable support strap to demonstrate the effects of the shape of the bladder 202 on the stability of the subject 102 as depicted with thick arrows on the subject 102. It should be also understood that although one bladder 202 is shown, more than one may be used. It should further be understood that the size of the bladder 202 is not limited to the size shown in FIGS. 2A-2C.

Referring now to FIG. 2C, a pair of illustrative inflatable support straps 200, each having a bladder 202 integrated therein, is depicted. Each of the inflatable support straps 200 may include a body 210 defining a cavity 212 that is shaped, sized, and configured to receive one or more bladders 202 (FIGS. 2A-2B) therein (bladders 202 not depicted in FIG. 2C because they are located within the cavity 212). The body 210 may be made of any flexible material suitable for holding a bladder 202 and rotating a subject 102, as described in greater detail herein. In some embodiments, the bladder 202 may be discrete (e.g., removable from the body 210 of the inflatable support strap 200). That is, the body 210 of the inflatable support strap 200 may include one or more openings into the cavity 212 such that the bladder 202 may be removably received within the cavity 212. The bladder 202 may be shaped such that the cross section of the bladder 202 has a rounded shape when inflated and may be flat when deflated. The bladder 202 may be constructed such that the bladder 202 may be a predetermined height (e.g., a predetermined diameter) when inflated, such as, for example, about 3 inches, about 6 inches, about 9 inches, or any other particular height for providing a clearance between the subject 102 and a support surface on which the subject 102 and inflatable support strap 200 are resting. The bladder 202 may also be constructed such that the bladder 202 has a length that spans the width of the subject 102, such as about 12 inches, about 14 inches, about 16 inches, about 18 inches, or any other length for spanning the width of the subject 102. In some embodiments, the bladder 202 may be constructed in other (e.g., smaller or larger) sizes for a more custom experience for the subject 102 (e.g., a size that more closely aligns with the dimensions of the body of the subject 102). Accordingly, the bladder 202 may be constructed such that the bladder 202 and/or other bladders may be placed within the same inflatable support strap 200 and have a length such as about 4 inches, about 8 inches, about 12 inches, or any other length that may be combined with a bladder of the same and/or another length in the same inflatable support strap 200.

In some embodiments, the body 210 of the inflatable support strap 200 includes at least one slot configured to receive one or more valves of the one or more bladders for inflation and/or deflation of the one or more bladders. The bladder 202 may contain a valve coupled to an interior of the bladder 202 for fluidly connecting the bladder 202 to a fluid pump. The valve may also be used to release fluid from the bladder 202. The inflatable support strap 200 may be inflated by a fluid pump in fluid communication with the bladder 202 of the inflatable support strap 200. The fluid pump may be coupled via a tube, a hose, and/or the like to the bladder 202 such that the fluid pump may fill the bladder 202 with a fluid. The fluid pump may also or instead be integrated with the valve. For example, the fluid pump may include a blower, a mattress air system, a compressed air canister, or any other device or system that is adapted for providing a fluid.

The cavity 212 of the body 210 may be configured to receive one or more bladders 202 therein. Additionally or alternatively, the cavity 212 of the inflatable support strap 200 may have one or more dividers that define a plurality of cavities 212, each capable of receiving one or more bladders 202 therein that are individually inflatable relative to each other. In embodiments where the bladder 202 is integrated into the body 210 of the inflatable support strap 200, the body 210 may have one or more welded portions corresponding to the one or more welded portions of the bladder 202 that define the plurality of cavities within the bladder 202. For example, an inflatable support strap 200 may have a plurality of cavities distributed along the length of the inflatable support strap 200, wherein one or more cavities may receive a bladder to customize the location of the bladders 202 relative to the subject 102.

In other embodiments, the bladder 202 may be integrated with the body 210 of the inflatable support strap 200. That is, the body 210 of the inflatable support strap 200 may be joined together with the body 210 of the bladder 202 (e.g., joining the ends 206, 208 of the bladder 202 with portions of the body 210 of the inflatable support strap 200). In still other embodiments, the bladder 202 may be integrated with the body 210 of the inflatable support strap 200 such that body 201 of the bladder 202 and the body 210 of the inflatable support strap 200 are the same (e.g., at least a portion of the material forming the body 210 of the inflatable support strap 200 is formed of the material described hereinabove for forming the body 201 of the bladder 202). It should be understood that the size, shape, and configuration of the body 210 of the inflatable support strap 200 are not limited to those depicted in FIG. 2C. Additional features of the body 210 of the inflatable support strap 200 are contemplated in FIGS. 5A-5E.

Figure 3A:
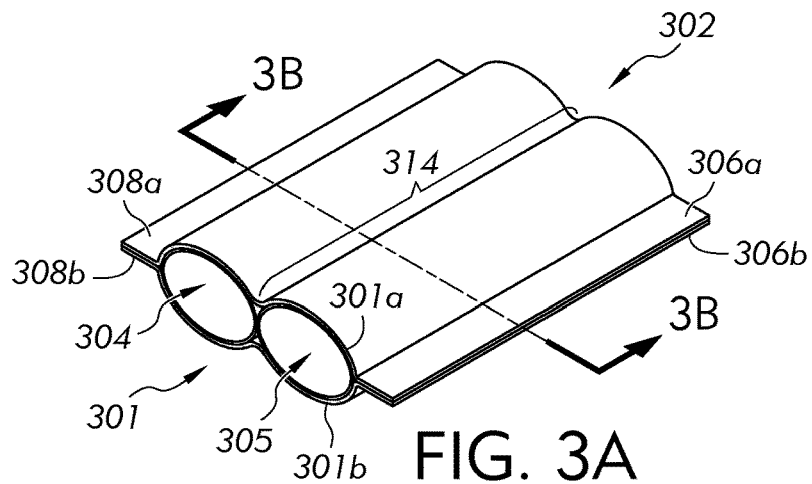
FIG. 3A schematically depicts another illustrative bladder, according to one or more embodiments shown and described herein.
Figure 3B:
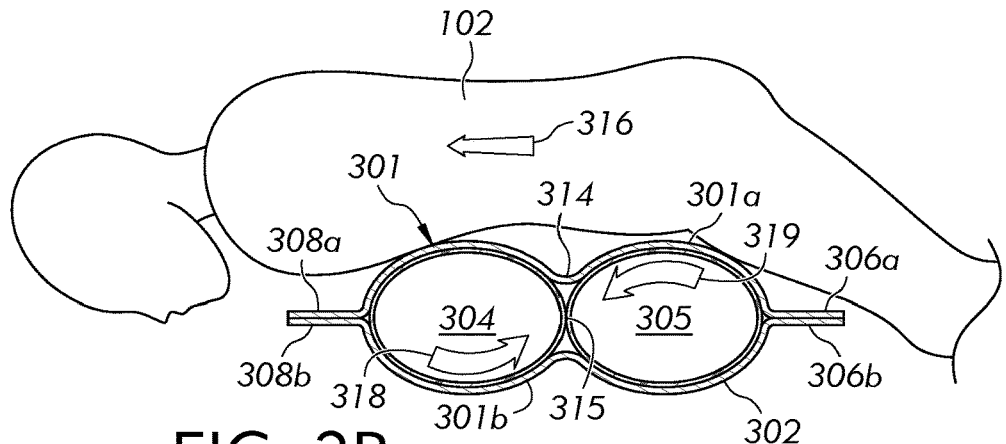
FIG. 3B schematically depicts a cross-section of the bladder of FIG. 3A, taken along line 3B-3B, when supporting a subject, according to one or more embodiments described herein.
Figure 3C:
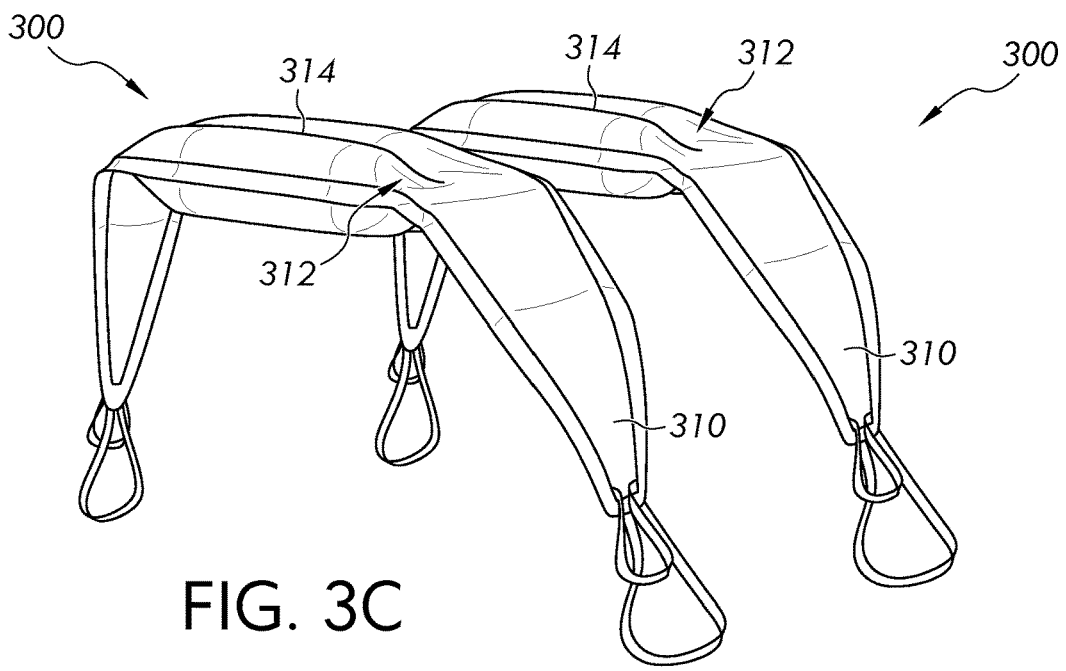
FIG. 3C schematically depicts a pair of illustrative support straps, each having an integrated bladder, according to one or more embodiments described herein.

FIGS. 3A-3C depict various illustrative features of another illustrative bladder 302 that may be placed within an interior of an inflatable support strap 300 for the purposes of inflation thereof.

Referring now to FIG. 3A, an illustrative bladder 302 is schematically depicted. FIG. 3A depicts the bladder 302 in an isometric perspective that truncates the ends of the bladder 302 for illustrative purposes. The bladder 302 may be formed by any pliant material capable of holding a fluid (e.g., air). Such materials may include, for example, any PVC or polyurethane coated fibrous material, rubber, or the like. The bladder 302 may be monolithically formed (e.g., formed from a single piece of material) or may be formed from a plurality of pieces of material. The materials may be welded, glued, sewed, or affixed to each other by any means for joining two pieces of material together to form a hermetic seal that defines at least two cavities 304, 305 therein. The bladder 302 may also include a laterally extending welded portion 314 for reducing the curvature of the bladder and thereby improving the stability of the subject.

As depicted in FIG. 3A, the bladder 302 includes the body 301 formed from a first component 301a and a second component 301b that are joined together. For example, the first component 301a may be a single material including a first end 306a and a second end 308a. Similarly, the second component 301b may be a single material including a first end 306b and a second end 308b. In some embodiments, the first component 301a and the second component 301b may be joined together at first ends 306a, 306b, and also at second ends 308a, 308b thereof to form the cavities 304, 305 between the ends 306a, 306b and 308a, 308b. In some embodiments, portions of the body 301 of the bladder 302 may also be joined together in one or more other areas to form a plurality of cavities, niches, and/or the like. It should be understood that FIG. 3A is truncated to expose the cavities 304, 305 and that portions of the body 301 may otherwise be joined together to form and seal the cavities 304, 305. While not depicted in FIGS. 3A-3C, the body 301 may include one or more inlets, outlets, vents, valves, and/or the like that provide access to the cavities 304, 305 for the purposes of inflating the bladder 302 (e.g., dispensing a fluid within one or more of cavities 304, 305 thereof), deflating the bladder 302 (e.g., venting a fluid within one or more of cavities 304, 305 thereof), and/or the like.

Referring now to FIG. 3B, a cross-section of a bladder 302 disposed within an inflatable support strap 300 supporting the subject 102 is schematically depicted. The bladder 302 is inflated such that the subject 102 maintains no upper body contact with the support surface 104. The bladder 302 may be inflated or deflated as needed to improve comfort and/or stability of the subject 102, to prepare the bladder 302 for storage, or any other reason. The design of the bladder 302 may be desirable for enhanced stability of the subject 102. The laterally extending welded portion 314 reduces the curvature of the bladder 302 as compared to the bladder 202 of FIGS. 2A-2C. Whereas the rounded shape of the bladder 202 of FIGS. 2A-2C may cause the bladder 202 to be more susceptible to rotation and cause movement of the subject 102, the shape of the bladder 302 offers significant improvements in subject 102 stability. Each of the cavities 304, 305 of the bladder 302 have a rounded shape, but the cavities 304, 305 are connected by the welded portion 314. If a force is applied on the subject 102 in a first direction 316 tangent to the bladder 202, the rounded shape of the cavities 304, 305 may cause the cavities 304, 305 to rotate in corresponding first rotational directions 318, 319, respectively, similar to that of bladder 202 depicted in FIG. 2B. However, the welded portion 314 connecting the cavities 304, 305 prevents their rotation because opposite rotation efforts of the cavities 304, 305 relative to a fixation point 315 at the welded portion 314 prevent further rotation of the cavities 304, 305, and thus keep the bladder 302 stable.

However, the shape of the bladder 302 may increase the difficulty of manufacturing and design because the welded portion 314 may introduce additional steps in the manufacturing process. The shape of the bladder 302 may also result in a lower level of clearance as compared to the bladder 202.

It should be understood that only the bladder 302 is shown between the subject 102 and the support surface 104 without the body of the inflatable support strap to demonstrate the effects of the shape of the bladder 302 on the stability of the subject 102 as depicted with arrows on the subject 102. It should be also understood that although one bladder 302 is shown, more than one may be used. It should further be understood that the size of the bladder 302 is not limited to the size shown in FIGS. 3A-3C.

Referring now to FIG. 3C, a pair of illustrative inflatable support straps 300, each having a bladder 302 integrated therein, is depicted. Each of the inflatable support straps 300 may include a body 310 defining a cavity 312 that is shaped, sized, and configured to receive one or more bladders 302 (FIGS. 3A-3B) therein (bladders 302 not depicted in FIG. 3C because they are located within the cavity 312). The body 310 may be made of any flexible material suitable for holding a bladder 302 and rotating a subject 102, as described in greater detail herein. In some embodiments, the bladder 302 may be discrete (e.g., removable from the body 310 of the inflatable support strap 300). That is, the body 310 of the inflatable support strap 300 may include one or more openings into the cavity 312 such that the bladder 302 may be removably received within the cavity 312. The bladder 302 may be shaped such that the cross section of the bladder 302 has a rounded shape when inflated and may be flat when deflated. The bladder 302 may be constructed such that the bladder 302 may be a desired height when inflated, such as 3 inches, 6 inches, 9 inches, or any other desired height for providing a clearance between the subject 102 and a support surface on which the subject 102 and inflatable support strap 300 are resting. The bladder 302 may also be constructed such that the bladder 302 is a length that spans the width of the subject 102, such as about 12 inches, about 14 inches, about 16 inches, about 18 inches, or any other length for spanning the width of the subject 102. In some embodiments, the bladder 302 may be constructed in other (e.g., smaller or larger) sizes for a more custom experience for the subject 102 (e.g., a size that more closely aligns with the dimensions of the body of the subject 102). Accordingly, the bladder 302 may be constructed such that the bladder 302 and/or other bladders may be placed within the same inflatable support strap 300 and have a length such as about 4 inches, about 8 inches, about 12 inches, or any other length that may be combined with a bladder of the same and/or another length in the same inflatable support strap 300.

In some embodiments, the body 310 of the inflatable support strap 300 includes at least one slot configured to receive one or more valves of the one or more bladders for inflation and/or deflation of the one or more bladders. The bladder 302 may contain a valve coupled to an interior of the bladder 302 for fluidly connecting the bladder 302 to a fluid pump. The valve may also be used to release fluid from the bladder 302. The inflatable support strap 300 may be inflated by a fluid pump in fluid communication with the bladder 302 of the inflatable support strap 300. The fluid pump may be coupled via a tube, a hose, and/or the like to the bladder 302 such that the fluid pump may fill the bladder 302 with a fluid. The fluid pump may also or instead be integrated with the valve. For example, the fluid pump may include a blower, a mattress air system, a compressed air canister, or any other device or system that is adapted for providing a fluid.

The cavity 312 of the body 310 may be configured to receive one or more bladders 302 therein. Additionally or alternatively, the cavity 312 of the inflatable support strap 300 may have one or more dividers that define a plurality of cavities 312, each capable of receiving one or more bladders 302 therein that are individually inflatable relative to each other. In embodiments where the bladder 302 is integrated into the body 310 of the inflatable support strap 300, the body 310 may have one or more welded portions corresponding to the one or more welded portions of the bladder 302 that define the plurality of cavities within the bladder 302. For example, an inflatable support strap 300 may have a plurality of cavities distributed along the length of the inflatable support strap 300, wherein one or more cavities may receive a bladder to customize the location of the bladders 302 relative to the subject 102.

In other embodiments, the bladder 302 may be integrated with the body 310 of the inflatable support strap 300. That is, the body 310 of the inflatable support strap 300 may be joined together with the body 310 of the bladder 302 (e.g., joining the ends 306, 308 of the bladder 302 with portions of the body 310 of the inflatable support strap 300). In still other embodiments, the bladder 302 may be integrated with the body 310 of the inflatable support strap 300 such that the body 301 of the bladder 302 and the body of the inflatable support strap 300 are the same (e.g., at least a portion of the material forming the body 310 of the inflatable support strap 300 is formed of the material described hereinabove for forming the body 301 of the bladder 302). It should be understood that the size, shape, and configuration of the body 310 of the inflatable support strap 300 are not limited to those depicted in FIG. 3C. Additional features of the body 310 of the inflatable support strap 300 are contemplated in FIGS. 5A-5E.

Figure 4A:
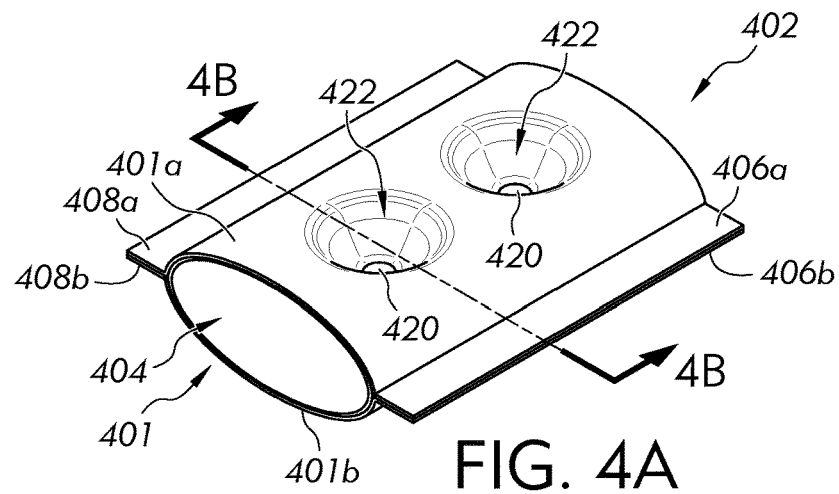
FIG. 4A schematically depicts another illustrative bladder, according to one or more embodiments shown and described herein.
Figure 4B:
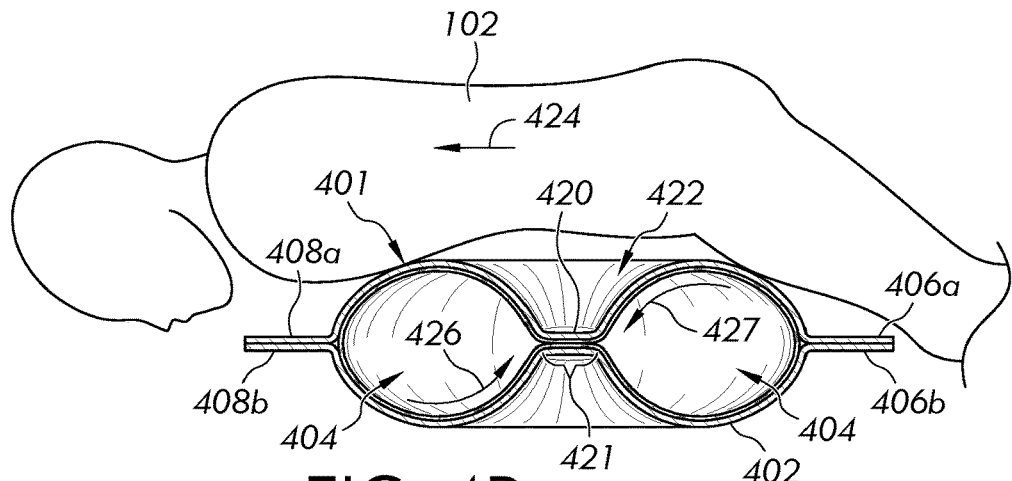
FIG. 4B schematically depicts a cross-section of the bladder of FIG. 4A when supporting a subject, according to one or more embodiments described herein.
Figure 4C:
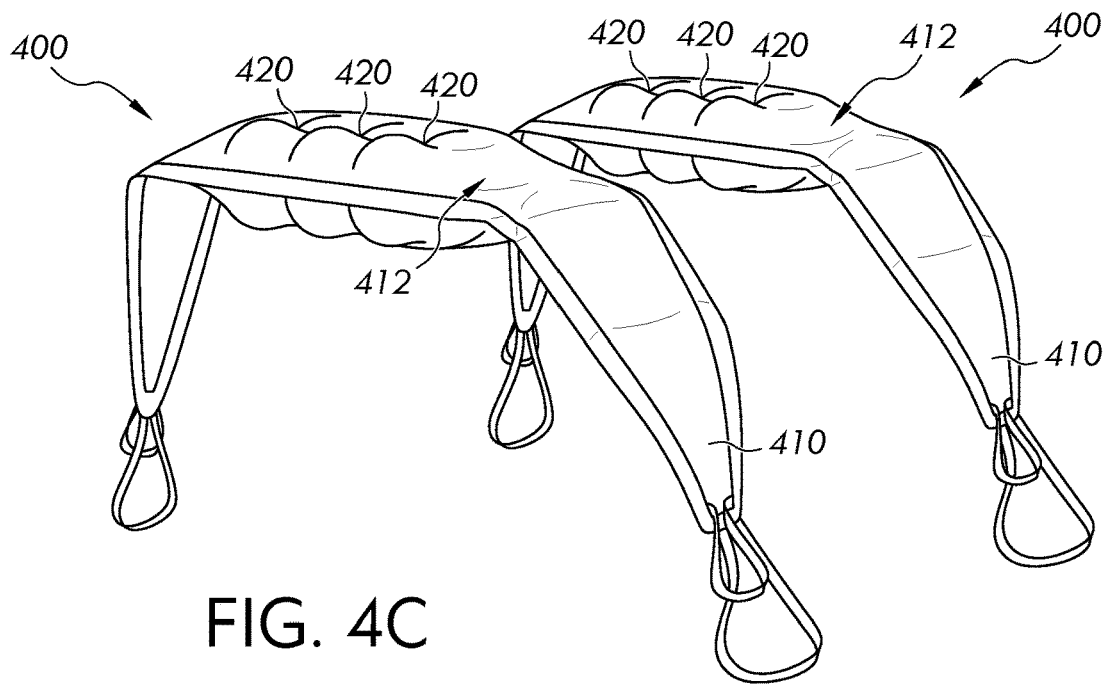
FIG. 4C schematically depicts a pair of illustrative support straps, each having an integrated quilted bladder, according to one or more embodiments described herein.

FIGS. 4A-4C depict various illustrative features of yet another bladder 402 that may be placed within an interior of an inflatable support strap 400 for the purposes of inflation thereof.

Referring now to FIG. 4A, an illustrative bladder 402 is schematically depicted. FIG. 4A depicts the bladder 402 in an isometric perspective that truncates the ends of the bladder 402 for illustrative purposes. The bladder 402 may be formed by any pliant material capable holding a fluid (e.g., air). Such materials may include, for example, any PVC or polyurethane coated fibrous material, rubber, or the like. The bladder 402 may be monolithically formed (e.g., formed from a single piece of material) or may be formed from a plurality of pieces of material. The materials may be welded, glued, sewed, or affixed to each other by any means for joining two pieces of material together to form a hermetic seal. The bladder 402 may also include one or more welded points 420 that create dips 422 in the body 401 of the bladder 402. The dips 422 created by the welded points 420 further reduce the curvature of the bladder and thereby improving the stability of the subject 102.

As depicted in FIG. 4A, the bladder 402 includes the body 401 formed from a first component 401a and a second component 401b that are joined together. For example, the first component 401a may be a single material including a first end 406a and a second end 408a. Similarly, the second component 401b may be a single material including a first end 406b and a second end 408b. In some embodiments, the first component 401a and the second component 401b may be joined together at first ends 406a, 406b, and also at second ends 408a, 408b thereof to form the cavity 404 between the ends 406a, 406b and 408a, 408b. In some embodiments, portions of the body 401 of the bladder 402 may also be joined together in one or more other areas to form a plurality of cavities, niches, and/or the like. It should be understood that FIG. 4A is truncated to expose the cavity 404 and that portions of the body 401 may otherwise be joined together to form and seal the cavity 404. While not depicted in FIGS. 4A-4C, the body 401 may include one or more inlets, outlets, vents, valves, and/or the like that provide access to the cavity 404 for the purposes of inflating the bladder 402 (e.g., dispensing a fluid within the cavity 404 thereof), deflating the bladder 402 (e.g., venting a fluid within the cavity 404 thereof), and/or the like.

Referring now to FIG. 4B, a cross-section of the bladder 402 disposed within an inflatable support strap 400 supporting the subject 102 is schematically depicted. The bladder 402 is inflated such that the subject 102 maintains no upper body contact with the support surface 104. The bladder 402 may be inflated or deflated as needed to improve comfort and/or stability of the subject 102, to prepare the bladder 402 for storage, or any other reason. The design of the bladder 402 may be desirable for enhanced stability of the subject 102 because the welded points 420 further reduces the curvature of the bladder 402 as compared to the bladder 202 of FIGS. 2A-2C and to the bladder 302 of FIGS. 3A-3C. For the similar reasons as bladder 302, the shape of the bladder 402 offers significant improvements in subject 102 stability. The cross-sectional view of the cavity 404 of the bladder 402 shows two rounded sections defined by welded points 420 therebetween. If a force is applied on the subject 102 in a direction 424 tangent to the bladder 202, the rounded shape of the rounded sections of the cavity 404 may cause the rounded sections to be more susceptible to rotation in directions 426, 427, much like bladder 302, and cause movement of the subject 102. However, the welded points 420 defining the rounded sections of the cavity 404 prevent the rotation of the rounded sections because the opposite rotation efforts of the rounded sections of the cavity 404 relative to fixation points 421 at the welded points 420 prevent the rotation of the rounded sections of cavity 404, and thus keep the bladder 402 stable.

However, the design of the bladder 402 may increase the difficulty of manufacturing because the welded points 420 may introduce additional steps in the manufacturing process. The bladder 402 design may also result in a lower level of clearance as compared to the bladder 202 and to the bladder 302.

It should be understood that only the bladder 402 is shown between the subject 102 and the support surface 104 without the body of the inflatable support strap to demonstrate the effects of the shape of the bladder 402 on the stability of the subject 102 as depicted with thin arrows on the subject 102. It should be also understood that although one bladder 402 is shown, more than one may be used. It should further be understood that the size of the bladder 402 is not limited to the size shown.

Referring now to FIG. 4C, a pair of illustrative inflatable support straps 400, each having a bladder 402 integrated therein, is depicted. Each of the inflatable support straps 400 may include a body 410 that is shaped, sized, and configured to receive one or more bladders 402 (FIGS. 4A-4B) therein (bladders 402 not depicted in FIG. 4C because they are located within the cavity 412). The body 410 may be made of any flexible material suitable for holding a bladder 402 and rotating a subject 102, as described in greater detail herein. In some embodiments, the bladder 402 may be discrete (e.g., removable from the body 410 of the inflatable support strap 400). That is, the body 410 of the inflatable support strap 400 may include one or more openings in to the cavity 412 such that the bladder 402 may be removably received within the cavity 412. The bladder 402 may be shaped such that the cross section of the bladder 402 has a rounded shape when inflated and may be flat when deflated. The bladder 402 may be constructed such that the bladder 402 may be a desired height when inflated, such as 3 inches, 6 inches, 9 inches, or any other desired height for providing a clearance between the subject 102 and a support surface on which the subject 102 and inflatable support strap 400 are resting. The bladder 402 may also be constructed such that the bladder 402 is a length that spans the width of the subject 102, such as about 12 inches, about 14 inches, about 16 inches, about 18 inches, or any other length for spanning the width of the subject 102. In some embodiments, the bladder 402 may be constructed in other (e.g., smaller or larger) sizes for a more custom experience for the subject 102 (e.g., a size that more closely aligns with the dimensions of the body of the subject 102). Accordingly, the bladder 402 may be constructed such that the bladder 402 and/or other bladders may be placed within the same inflatable support strap 400 and have a length such as about 4 inches, about 8 inches, about 12 inches, or any other length that may be combined with a bladder of the same and/or another length in the same inflatable support strap 400.

In some embodiments, the body 410 of the inflatable support strap 400 includes at least one slot configured to receive one or more valves of the one or more bladders for inflation and/or deflation of the one or more bladders. The bladder 402 may contain a valve coupled to an interior of the bladder 402 for fluidly connecting the bladder 402 to a fluid pump. The valve may also be used to release fluid from the bladder 402. The inflatable support strap 400 may be inflated by a fluid pump in fluid communication with the bladder 402 of the inflatable support strap 200. The fluid pump may be coupled via a tube, a hose, and/or the like to the bladder 202 such that the fluid pump may fill the bladder 202 with a fluid. The fluid pump may also or instead be integrated with the valve. For example, the fluid pump may include a blower, a mattress air system, a compressed air canister, or any other device or system that is adapted for providing a fluid.

The cavity 412 of the body 410 may be configured to receive one or more bladders 402 therein. Additionally or alternatively, the cavity 412 of the inflatable support strap 400 may have one or more dividers that define a plurality of cavities 412, each capable of receiving one or more bladders 402 therein that are individually inflatable relative to each other. In embodiments where the bladder 402 is integrated into the body 410 of the inflatable support strap 400, the body 410 may have one or more welded portions corresponding to the one or more welded portions of the bladder 402 that define the plurality of cavities within the bladder 402. For example, an inflatable support strap 400 may have a plurality of cavities distributed along the length of the inflatable support strap 400, wherein one or more cavities may receive a bladder to customize the location of the bladders 402 relative to the subject 102.

In other embodiments, the bladder 402 may be integrated with the body 410 of the inflatable support strap 400. That is, the body 410 of the inflatable support strap 400 may be joined together with the body 410 of the bladder 402 (e.g., joining the ends 406, 408 of the bladder 402 with portions of the body 410 of the inflatable support strap 400). In still other embodiments, the bladder 402 may be integrated with the body 410 of the inflatable support strap 400 such that body 401 of the bladder 402 and the body 410 of the inflatable support strap 400 are the same (e.g., at least a portion of the material forming the body 410 of the inflatable support strap 400 is formed of the material described hereinabove for forming the body 401 of the bladder 402). It should be understood that the size, shape, and configuration of the body 410 of the inflatable support strap 400 are not limited to those depicted in FIG. 4C. Additional features of the body 410 of the inflatable support strap 400 are contemplated in FIGS. 5A-5E.

FIGS. 5A-5E depict various illustrative features of a body of an inflatable support strap 500 that may be used to rotate and position a subject as described herein. The features depicted in each of FIGS. 5A-5E may be combined in any manner such that the inflatable support strap 500 can be customized with one or more of the features depicted in FIGS. 5A-5E. As such, the features depicted in each of FIGS. 5A-5E are not intended to be limited to certain embodiments that only contain the features depicted in a particular figure. In some embodiments, the various support straps depicted in FIGS. 5A-5E, may each be a modified commercially available support strap, such as the Liko® MultiStrap™ lift aid available from Hillrom or may be a wholly new strap not formed from an existing commercially available strap. Referring generally to FIGS. 5A-5E, the inflatable support strap 500 may generally be one or more flat strips of material that may be positioned under a subject (e.g., subject 102 depicted in FIG. 1). The one or more flat strips of material may be any flexible material suitable for receiving or forming a bladder as described hereinabove. The material used for the inflatable support strap 500 may be a one-time use material (e.g., a material that is meant to be disposed after use) in some embodiments, or may be a reusable material (e.g., a material that can be used a plurality of times) in other embodiments. The material may also be such that the inflatable support strap 500 can be placed under a subject and left in place for an extended period of time (e.g., a material that generally does not cause discomfort to a subject when being placed for an extended period of time).

Figure 5A:
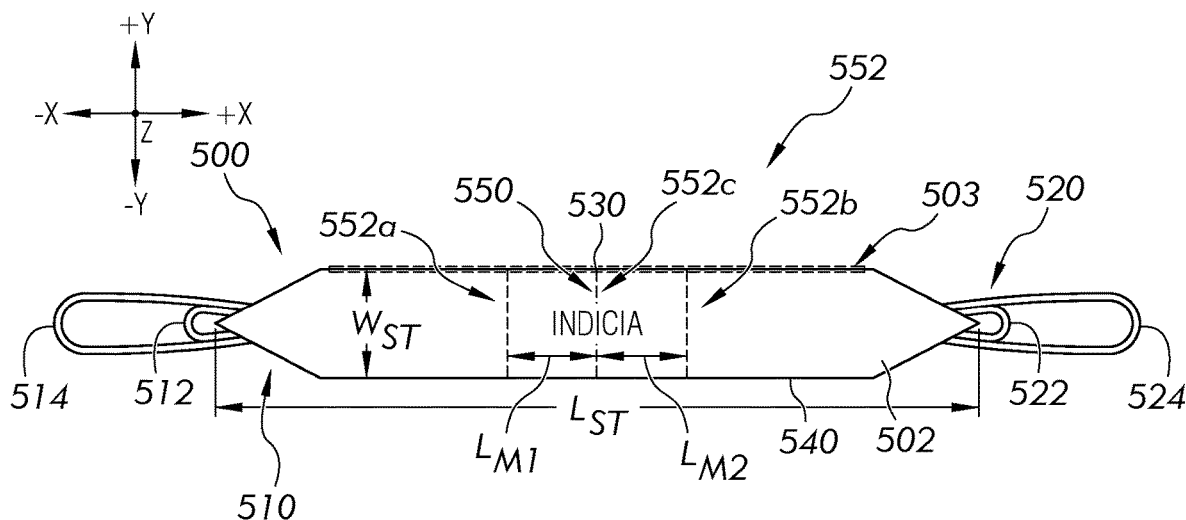
FIG. 5A schematically depicts an illustrative support strap having indicia thereon for the purposes of arranging a subject thereon, according to one or more embodiments shown and described herein.
Figure 6:
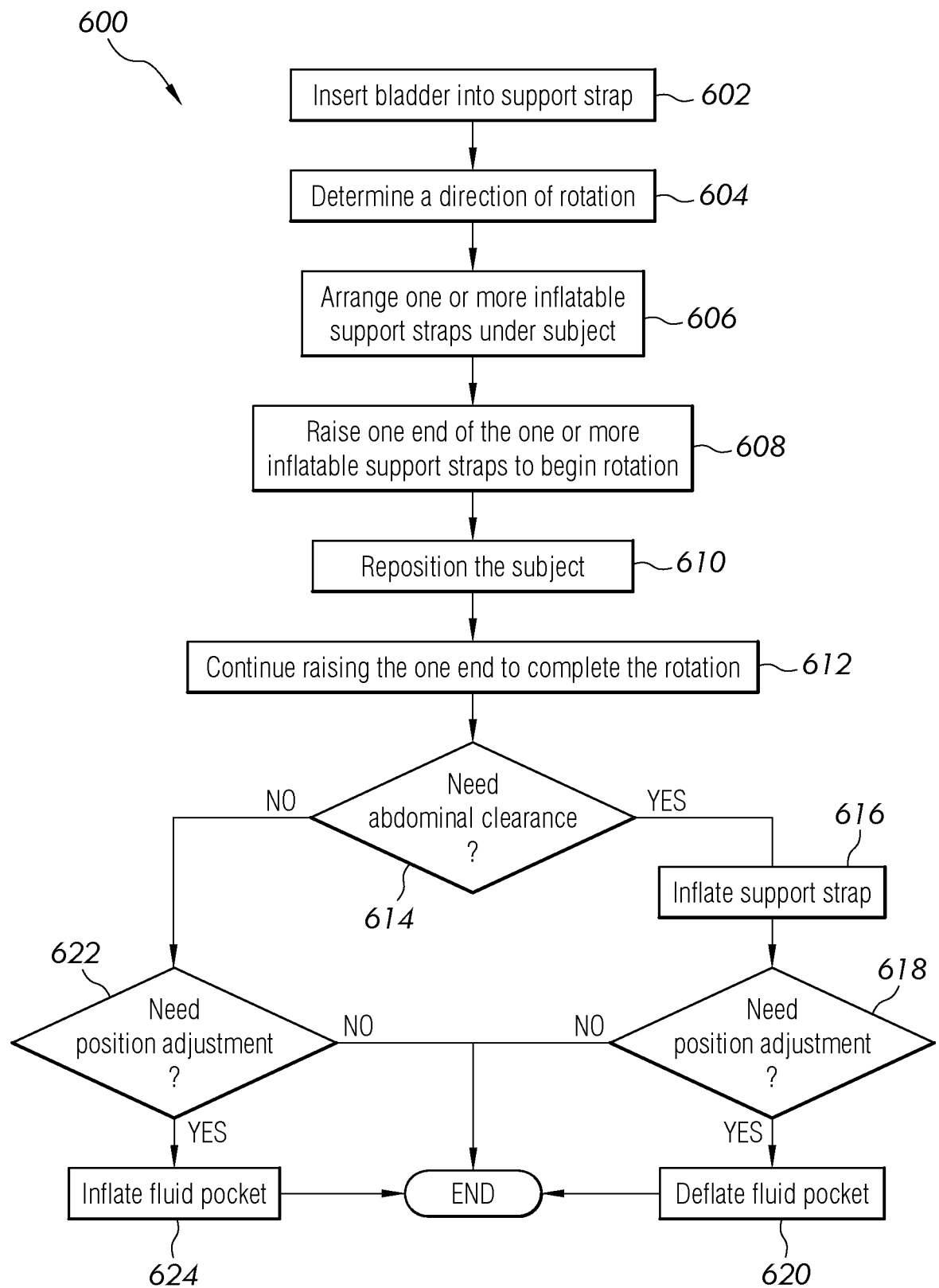
FIG. 6 depicts a flowchart of an illustrative method for rotating a subject with an inflatable support strap, according to one or more embodiments shown and described herein.

Referring now to FIG. 5A, the inflatable support strap 500 includes a body 502 constructed of a length $L_{ST}$ of material. The body 502 may be an elongate body, having a first end 510 separated from a second end 520 such that the first end 510 is spaced a distance equal to the length $L_{ST}$ apart from the second end 520. The length $L_{ST}$ of the inflatable support strap 500 may generally be any length, particularly lengths that are suitable for rotating a subject according to the methods described herein. In some embodiments, the length $L_{ST}$ of the inflatable support strap 500 may be such that, when a subject is arranged with respect to the inflatable support strap 500 as described herein, the inflatable support strap 500 extends a distance laterally from the subject on both sides of the subject. That is, the length $L_{ST}$ of the inflatable support strap 500 is longer than a lateral width of a subject at a location where the support strap is positioned, as described in greater detail herein. In some embodiments, the length $L_{ST}$ of the inflatable support strap 500 may be according to a particular type of inflatable support strap 500 (e.g., various lengths for small, medium, large, and extra-large sizes of inflatable support straps 500).

The inflatable support strap 500 may further include a first edge 530 (e.g., an upper edge) and a second edge 540 (e.g., a lower edge) spaced apart by a width $W_{ST}$. The width $W_{ST}$ of the inflatable support strap 500 may generally be any width, particularly widths that are sufficient to be placed underneath the subject when the subject is laying on a support surface. In some embodiments, the width $W_{ST}$ may be according to a particular type of inflatable support strap 500 (e.g., various widths for small, medium, large, and extra-large sizes of inflatable support straps 500).

The inflatable support strap 500 may be shaped, sized, and configured to receive one or more bladders. For example, the inflatable support strap 500 may be formed from a first component and a second component that are joined together. The first and second components may each include a first end 510, a second end 520, a first edge 530, and a second edge 540. The first and second components may be joined together at first ends 510, second ends 520, first edge 530, and/or second edge 540 to form a cavity between the first and second components for receiving one or more bladders. In some embodiments, portions of the first and second components may also be joined together between the first end 510 and the second end 520, and/or the first edge 530 and the second edge 540, in one or more other areas to form a plurality of cavities, pockets, dividers, and/or the like for receiving of bladders of varying shapes and/or sizes to thereby customize the location of the bladders relative to the subject.

In some embodiments, the body 502 of the inflatable support strap 500 may include at least one slot configured to receive one or more valves of one or more bladders for inflation and/or deflation of the one or more bladders.

The general shape of the inflatable support strap 500 may generally be any shape. For example, as depicted in the embodiment of FIGS. 5A-5E, the inflatable support strap 500 has a generally rectangular shape with tapered ends. That is, the inflatable support strap 500 depicted in the embodiment of FIGS. 5A-5E is shaped such that the first edge 530 and the second edge 540 taper to a point at the first end 510 and the second end 520, respectively. In some embodiments, the inflatable support strap 500 may be shaped such that the length $L_{ST}$ is generally a greater than the width $W_{ST}$ thereof. For example, the length $L_{ST}$ of the inflatable support strap 500 may be about three or more times greater than the width $W_{ST}$ of the inflatable support strap 500. Certain other shapes that allow for ease of use in placing the inflatable support strap 500 underneath a subject and installing a bladder are also contemplated, such as strips of material that have a length that is greater than a width thereof.

Still referring to FIG. 5A, the inflatable support strap 500 may generally be constructed of any type of material. In some embodiments, the inflatable support strap 500 may be constructed of a material that has load-bearing properties allowing the inflatable support strap 500 to support the weight of a human subject. In some embodiments, the inflatable support strap 500 may be formed from a textile comprising natural fibers that are derived from animal (protein), vegetable (cellulose), and/or mineral sources. Illustrative examples of natural fibers include, but are not limited to, cellulose (staple) fibers such as bast, leaf, seed hair, cane, grass, and reed; protein (staple) fibers such as hair, wool, and/or filaments (e.g., secretions such as silk); and mineral fibers such as asbestos, glass, gold, silver, and/or the like. In some embodiments, the inflatable support strap 500 may be formed from one or more manufactured fibers such as manmade, regenerated, or synthetic fibers having a chemical composition that is organic or inorganic or derivatives thereof. Illustrative examples of organic polymer fibers from natural sources include, but are not limited to, acetate, alginate, cupro, elastodiene, lyocell, model, triacetate, and viscose. Illustrative examples of organic fibers made from synthetic polymers include, but are not limited to, acrylic, aramid, chlorofibre, elastane, elastodiene, elastoelfin, elastomultiester, flurofiber, melamine, modacrylic, polyamide, polyester, polyethylene, polyimide, polylactic acid, polypropylene, polypropylene/polyamide biocomponent, and vinylal. Illustrative examples of inorganic fibers include, but are not limited to, carbon, ceramic, glass, and metal.

The inflatable support strap 500 generally includes at least one first long loop 514 extending from the first end 510 of the body 502 and at least one second long loop 524 extending from the second end 520 of the body 502. The long loops 514, 524 each provide a connection point for the inflatable support strap 500 to be connected to another object or used as a handle. For example, in the embodiments described herein, the long loops 514, 524 may be used as handles for rotating a subject. In some embodiments, the inflatable support strap 500 also includes at least one first short loop 512 extending from the first end 510 of the body 502 and at least one second short loop 522 extending from the second end 520 of the body 502. The short loops 512, 522 each provide a connection point for the inflatable support strap 500 to be connected to another object or used as a handle. For example, the short loops 512, 522 may be used in tandem with the long loops 514, 524 to facilitate rotating a subject using an overhead lift.

The loops (e.g., the first short loop 512, the first long loop 514, the second short loop 522, and the second long loop 524) are coupled to the body 502 of the inflatable support strap 500 by any means of coupling, including, but not limited to, stitching, welding, use of fasteners (e.g., rivets or the like), use of adhesives, and/or the like. In some embodiments, the long loops 514, 524 are integrated with the body 502 of the inflatable support strap 500. That is, the long loops 514, 524 are formed as an extension of the material of the inflatable support strap 500 such that the inflatable support strap 500 (including the loops) are all formed from a single piece of material. In some embodiments, the long loops 514, 524 may be formed as an extension of a piping material that surrounds the various edges of the body 502 of the inflatable support strap 500. In some embodiments, each loop may comprise a long loop and a short loop, the long loop being longer in overall length than the short loop for use with an overhead lift. As depicted in FIG. 5A, the first short loop 512 and the first long loop 514 are coupled to the tapered portion of the body 502 of the inflatable support strap 500 at the first end 510 thereof. Similarly, the second short loop 522 and the second long loop 524 are coupled to the tapered portion of the body 502 of the inflatable support strap 500 at the second end 520 thereof.

Like the body 502, the long loops 514, 524 may generally be constructed of any type of material. In some embodiments, the long loops 514, 524 may be constructed of a material that has load-bearing properties that allow the inflatable support strap 500, together with the long loops 514, 524, to support the weight of a human subject. In some embodiments, the long loops 514, 524 may be formed from a textile comprising natural fibers that are derived from animal (protein), vegetable (cellulose), and/or mineral sources. Illustrative examples of natural fibers include, but are not limited to, cellulose (staple) fibers such as bast, leaf, seed hair, cane, grass, and reed; protein (staple) fibers such as hair, wool, and/or filaments (e.g., secretions such as silk); and mineral fibers such as asbestos, glass, gold, silver, and/or the like. In some embodiments, the loops may be formed from one or more manufactured fibers such as manmade, regenerated, or synthetic fibers having a chemical composition that is organic or inorganic or derivatives thereof. Illustrative examples of organic polymer fibers from natural sources include, but are not limited to, acetate, alginate, cupro, elastodiene, lyocell, model, triacetate, and viscose. Illustrative examples of organic fibers made from synthetic polymers include, but are not limited to, acrylic, aramid, chlorofibre, elastane, elastodiene, elastoelfin, elastomultiester, flurofiber, melamine, modacrylic, polyamide, polyester, polyethylene, polyimide, polylactic acid, polypropylene, polypropylene/polyamide biocomponent, and vinylal. Illustrative examples of inorganic fibers include, but are not limited to, carbon, ceramic, glass, and metal. In some embodiments, the long loops 514, 524 may be formed of the same material as the material used for the remainder of the inflatable support strap 500. In other embodiments, the long loops 514, 524 may be formed from a different material than the material used for the remainder of the inflatable support strap 500.

The inflatable support strap 500 may also include a plurality of loops along either or both of the first edge 530 and the second edge 540 (i.e., side loops) between the first end 510 and the second end 520. Each one of the plurality of side loops may be similar in design and construction as the various loops described herein (e.g., the first long loop 514, the second long loop 524 described herein). The plurality of side loops can be gripped by a user and used as an additional grip point for moving the inflatable support strap 500 relative to a subject. In some embodiments, the plurality of side loops may be disposed approximately equidistant from one another between the first end 510 and the second end 520 of the body 502.

Still referring to FIG. 5A, in some embodiments, the inflatable support strap 500 may have indicia 550 thereon. The location and type of indicia 550 may generally be any location and type. For example, the indicia 550 may be disposed on an outer surface of the body 502. The various embodiments discussed herein with respect to FIG. 5A provide illustrative examples of indicia that may be present on the inflatable support strap 500. The indicia 550 may provide an indication of an arrangement of one or more bladders with respect to the body 502 of the inflatable support strap 500. That is, the indicia 550 provides one or more indicators to a user about how to install, remove, inflate, and/or deflate the bladder with respect to the inflatable support strap 500 to ensure the inflatable support strap 500 may be appropriately utilized.

The indicia 550 may also provide an indication of an arrangement of the inflatable support strap 500 with respect to a subject. That is, the indicia 550 provides one or more indicators to a user about how to position the subject with respect to the inflatable support strap 500 to ensure the subject is appropriately rotated when lifted. For example, the indicia 550 may indicate an arrangement of the inflatable support strap 500 with respect to the subject such that a centerline of the subject is not aligned with a true line of symmetry of the inflatable support strap 500. The indicia 550 may be placed such that a centerline of the subject is aligned with the center of the inflatable support strap 500 so that the subject is not aligned with the true line of symmetry of the inflatable support strap 500 but rather is aligned with the inflatable support strap 500 such that the subject is more appropriately positioned for rotation.

The indicia 550 may also provide an indication of an arrangement of the bladders with respect to the inflatable support strap 500. That is, the indicia 550 provides one or more indicators to a user about how to position the bladders with respect to the inflatable support strap 500 to achieve a particular type of clearance or rotation. For example, the indicia 550 may indicate an arrangement of bladders with respect to the inflatable support strap 500 such that the subject is evenly elevated by the inflatable support strap 500. The indicia 550 may also or instead indicate an arrangement of bladders with respect to the inflatable support strap 500 such that the subject is unevenly elevated by the inflatable support strap 500 to provide a slight rotation that elevates one side of the subject.

Indicia 550 is depicted in FIG. 5A as a first edge marker 552a, a second edge marker 552b, and/or a centerline marker 552c (collectively, markers 552). The first edge marker 552a and the second edge marker 552b are generally spaced a distance apart from the centerline marker 552c and represent outer bounds of where a subject should be located when positioned with respect to the inflatable support strap 500. For example, the first edge marker 552a may be placed a first marker length $L_{M1}$ from the centerline marker 552c and the second edge marker 552b may be placed a second marker length $L_{M2}$ from the centerline marker 552c. In some embodiments, the first marker length $L_{M1}$ and the second marker length $L_{M2}$ may be substantially equal to one another. In other embodiments, the first marker length $L_{M1}$ may be different (e.g., shorter or longer) than the second marker length $L_{M1}$. In some embodiments, the first marker length $L_{M1}$ of the first edge marker 552a and the second marker length $L_{M2}$ of the second edge marker 552b may be such that a distance between the first edge marker 552a and the first end 510 and/or a distance between the second edge marker 552b and the second end 520 allows for sufficient length of the inflatable support strap 500 necessary to cover a subject positioned on the inflatable support strap 500 while the subject is rotating. That is, the first edge marker 552a and the second edge marker 552b are not placed so close to the first end 510 and the second end 520 that the respective loops cannot be lifted or coupled to an overhead lift because of an insufficient length of material available for a connection due to a location of the subject with respect to the inflatable support strap 500. In some embodiments, the first marker length $L_{M1}$ of the first edge marker 552a and the second marker length $L_{M2}$ of the second edge marker 552b may be customized such that certain inflatable support straps 500 have particular lengths to correspond to particular subject sizes (e.g., particular lengths for small, medium, large, and extra-large sizes of inflatable support straps 500).

In some embodiments, a plurality of first edge markers 552a and a plurality of edge markers 552b may be provided at varying distances from the centerline marker 552c, where each pair of first edge markers 552a and second edge markers 552b corresponds to a particular subject size. For example, a first pair of edge markers may be spaced closer together relative to other pairs (e.g., such that $L_{M1}+L_{M2}$ is smaller relative to other pairs), which may be used for relatively smaller subjects (e.g., a size small pair), a second pair of edge markers may be spaced further apart relative to other pairs (e.g., such that $L_{M1}+L_{M2}$ is larger relative to other pairs), which may be used for relatively larger subjects (e.g., a size large pair), and a third pair of edge markers may be spaced between the first pair and the second pair (e.g., such that $L_{M1}+L_{M2}$ of the third pair is between the other pairs), which may be used for medium-sized subjects (e.g., a size medium pair). In some embodiments, the various pairs may be indicated by size with other indicia 550 such that a user can determine which pair to use for a particular subject.

While the embodiment of FIG. 5A depicts the first edge marker 552*a*, the second edge marker 552*b*, and the centerline marker 552*c* as being dashed lines that run from the first edge 530 to the second edge 540, the present disclosure is not limited to such. That is, the first edge marker 552*a*, the second edge marker 552*b*, and the centerline marker 552*c* may each be any other type of line, shape, image, or the like that provides an indicator as described herein. For example, the first edge marker 552*a*, the second edge marker 552*b*, and the centerline marker 552*c* could be formed in the approximate shape of a portion of a human torso. Still further, the indicia 550 depicted in FIG. 5A as the first edge marker 552*a*, the second edge marker 552*b*, and the centerline marker 552*c* and text is also merely one illustrative example. That is, the indicia 550 may be other objects, images, renderings, drawings, or the like. For example, the indicia 550 may be an image or an outline of one or more anatomical features to aid in alignment with corresponding anatomical features of a subject. That is, in embodiments where the inflatable support strap 500 is to be arranged at a chest area of a subject, the indicia 550 may be a partial torso outline of a subject chest (e.g., one or more features of a chest area), a drawing of ribs, arms, and/or the like. In embodiments where the inflatable support strap 500 is to be arranged at or near a greater trochanter of a subject, the indicia 550 may be a partial outline of a subject hip area, a drawing of hip bones, a drawing of leg bones, and/or the like. In another example, the indicia 550 may provide an indication that the first edge 530 of the body 502 of the inflatable support strap 500 is to be particularly placed with respect to the subject. In yet another example, the indicia 550 may provide an indication that the second edge 540 of the body 502 of the inflatable support strap 500 is to be particularly placed with respect to the subject. That is, the indicia 550 may include one or more arrows, text, anatomical drawings, measurement marks (e.g., a ruler), or the like that indicates that the second edge 540 of the body 502 of the inflatable support strap 500 is to be longitudinally positioned at a location that is between a waist and a knee of a subject and/or in an area that corresponds to a greater trochanter of the subject.

Figure 5B:
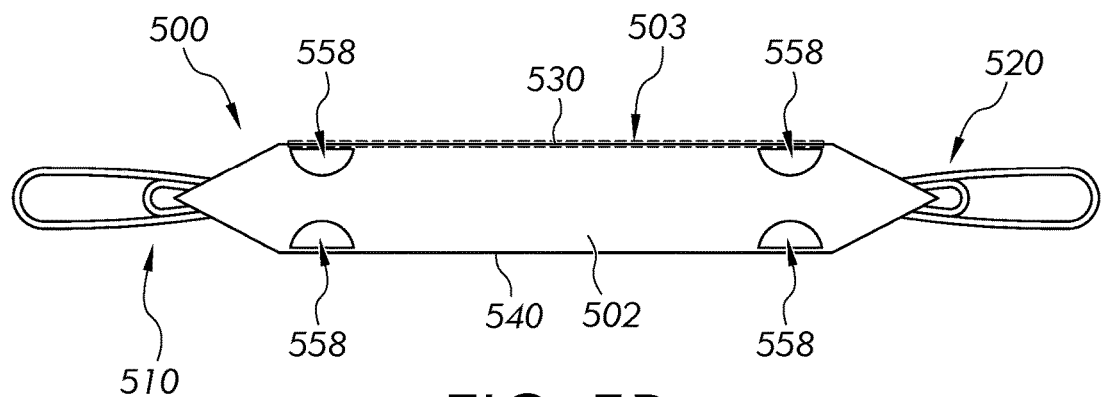
FIG. 5B schematically depicts another illustrative support strap having a plurality of cut out portions at each end of the support strap, according to one or more embodiments shown and described herein.
Figure 5C:
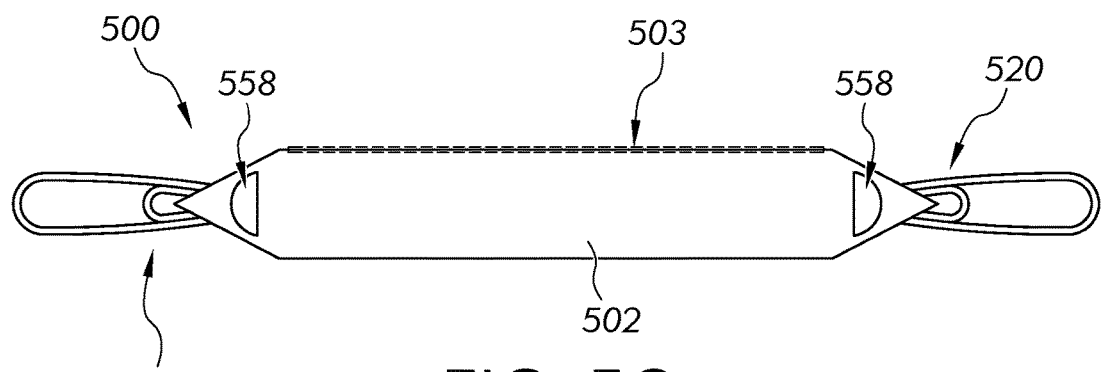
FIG. 5C schematically depicts another illustrative support strap having a single cut out portion at each end of the support strap, according to one or more embodiments shown and described herein.

FIGS. 5B and 5C depict two illustrative embodiments of various grip points that may be located on the inflatable support strap 500 to aid users in holding onto the inflatable support strap 500 when arranging the inflatable support strap 500 with respect to the subject. More specifically, FIG. 5B depicts two cut out portions 558 located at each of the first end 510 and the second end 520 of the body 502 of the inflatable support strap 500, and FIG. 5C depicts a single cut out portion 558 located at each of the first end 510 and the second end 520 of the body 502 of the inflatable support strap 500. The cut out portions 558 are generally holes in the material of the body 502 that allow objects (e.g., fingers or the like) to pass through. The cut out portions 558 may be a grasping point for positioning the support strap with respect to the subject. FIG. 5B generally depicts the cut out portions 558 as being aligned with the first edge 530 and the second edge 540 of the body 502 of the inflatable support strap 500 such that a user could, for example, grasp the edges 530, 540 at either the first end 510 or the second end 520 of the body 502 and wrap his or her fingers through the cut out portions 558 to establish a grip on the inflatable support strap 500. FIG. 5C generally depicts the cut out portions 558 as being in or near the tapered portions of the body 502 at the first end 510 and the second end 520 such that a user could, for example, grasp the area of the tapered portion and wrap his or her fingers through a cut out portion 558 to establish a grip on the inflatable support strap 500. In some embodiments, the cut out portions 558 may be reinforced such that they can withstand the forces applied to the body 502 of the inflatable support strap 500 during movement. Other numbers and locations of cut out portions are contemplated and included within the scope of the present disclosure. While FIGS. 5B and 5C depict the cut out portions 558 being generally semicircular, other shapes of cut out portions 558 are contemplated and included within the scope of the present application. In addition, the size of the cut out portions 558 is not limited in the present disclosure, and the cut out portions 558 may be any size.

Figure 5D:
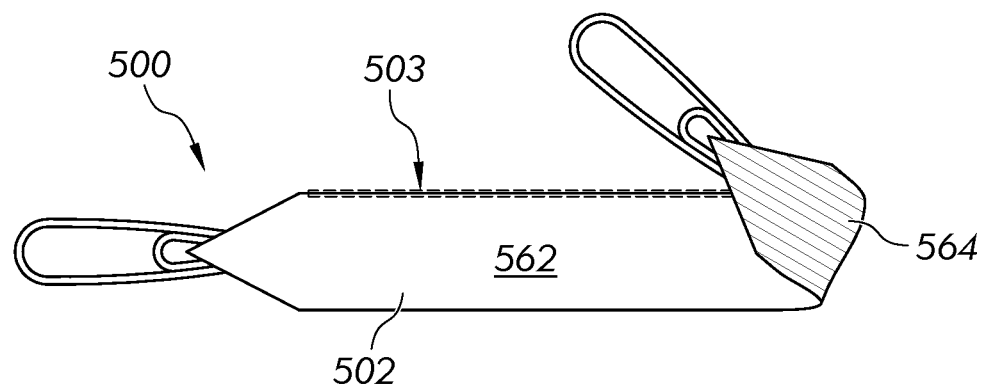
FIG. 5D schematically depicts another illustrative support strap having a first major surface with a high-friction material and a second major surface having a low-friction material, according to one or more embodiments shown and described herein.

FIG. 5D depicts another feature that may aid users in arranging the inflatable support strap 500 with respect to the subject and enhance the stability of a subject 102 when supported on the inflatable support strap 500 when inflated. More specifically, FIG. 5D depicts the body 502 of the inflatable support strap 500 having a first major surface 562 and a second major surface 564. The body 502 may be constructed such that the first major surface 562 is constructed of and/or coated with a high-friction material. Additionally or alternatively, the body 502 may be constructed such that the second major surface 564 is constructed of and/or coated with a low-friction material. The low-friction material is generally any material having a coefficient of friction that is lower than a coefficient of friction of the high-friction material. In some embodiments, the low-friction material may be any material that has a coefficient of friction that is lower than a coefficient of friction of an uncoated or untreated surface of the body 502. In some embodiments, the high-friction material may be any material that has a coefficient of friction that is the same or higher than a coefficient of friction of an uncoated or untreated surface of the body 502. The coefficient of friction is a quantitative measure of the friction between two surfaces, including the first major surface 562 and the second major surface 564, including surface roughness, and environmental conditions such as, but not limited to, temperature and humidity. In some embodiments, the second major surface 564 having the low-friction material may be constructed such that a low-friction coating on the second major surface 564 is directional. That is, for example, the second major surface 564 may exhibit a lower coefficient of friction along a length of the inflatable support strap 500 relative to a coefficient of friction along a width of the inflatable support strap 500.

In some embodiments, the inflatable support strap 500 may be arranged relative to the subject such that the first major surface 562 having the high-friction material faces the subject and the second major surface 564 having the low-friction material faces the surface upon which the subject is laying. Such an arrangement may allow the inflatable support strap to be more easily slid underneath the subject (e.g., such that the low-friction surface slides more easily along the support surface) relative to a surface not having the low friction material thereon or integrated therewith. Further, the high-friction material may retain a grip on the subject to avoid slippage, particularly when the subject is lifted for the purposes of turning or for the purposes of providing clearance.

Figure 5E:
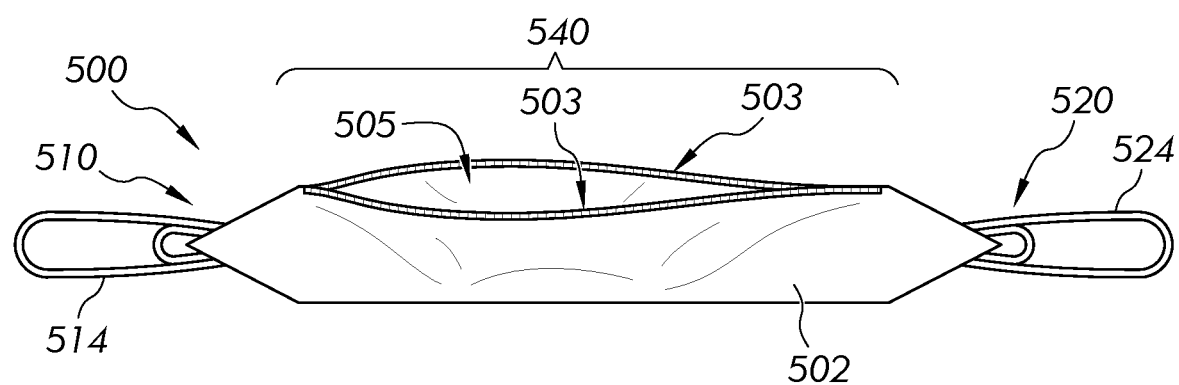
FIG. 5E schematically depicts another illustrative support strap opened for receiving a bladder, according to one or more embodiments shown and described herein.

FIG. 5E depicts a fastener 503 open for receiving a bladder. The fastener 503 may be any kind of fastener, such as a zipper as shown in FIGS. 5A-5E. Illustrative examples of other fasteners that may be used include, but are not limited to, latches, hook and loop tape, button loops and buttons, side release buckles, and the like. The fastener 503 may be constructed out of any material that permits the body 502 of the inflatable support strap 500 to bend for rotating the subject and that does not irritate the subject during rotation or while the inflatable support strap 500 remains under the subject. To prevent or reduce irritation of the subject by the fastener 503, the fastener 503 may contain a cover. The cover may be constructed such that it can be moved for accessing the fastener 503 and replaced over the fastener 503 to protect the subject.

The fastener 503 may be positioned along the first edge 530 of the first major surface 562 and second major surface 564 of the body 502 to secure the cavity 505 defined by the first major surface 562 and second major surface 564. The cavity 505 may be large enough to accommodate an inflated and/or deflated bladder such that the fastener 503 may be fastened to secure the bladder in its inflated and deflated states. The cavity 505 may also be large enough to accommodate a plurality of bladders such that the fasteners 503 may be fastened to secure the plurality of bladders. It should be understood that the position of the fasteners is not limited to the first edge 530 of the first major surface 562 and second major surface 564 of the body 502. For example, the first end 510 may have an opening to the cavity 505 spanning width $W_{ST}$ for receiving a bladder via the first end 510 and may also have a fastener for securing the cavity 505. In some embodiments, the body 502 may have multiple fasteners. For example, the body 502 may have multiple cavities each having their own opening and fastener for receiving and holding a bladder. As another example, the cavity 505 of the body 502 may have multiple openings to provide multiple access points to the cavity 505.

In some embodiments, the cavity may also include fasteners for securing a bladder to the cavity 505 on the interior of the body 502. For example, when a bladder is inserted into the cavity 505 and does not occupy the entirety of the cavity 505, the bladder may be fastened to the interior of the body 502 to prevent the bladder from shifting while the inflatable support strap 500 is in use. Additionally tor alternatively, the cavity 505 may include a plurality of dividers for holding a bladder in place in a position within the cavity 505. In embodiments, the fastener 503 may be omitted from the construction of the body 502 of the inflatable support strap 500. For example, when the bladder is integrated into the body 502 (i.e., is non-removable), the first major surface 562 and second major surface 564 are joined together and thus do not need fasteners to keep them together. As another example, the first major surface 562 may have extra material sufficient to fold over the second major surface 564 and thereby prevent the bladder from falling out of the cavity 505.

As noted hereinabove, the support straps may be placed for the purposes of reducing pressure ulcers on a subject, to increase subject comfort on a surface, and/or the like. In some embodiments, the support straps may also be used for the purposes of moving (e.g., rotating) subjects. Referring now to FIG. 6, a flow diagram of an illustrative method 600 for rotating a subject with one or more inflatable support straps is shown. Discussion of FIG. 6 will be made with reference to FIGS. 5A-5E and 7A-7F. The description of the method 600 generally relates to two caregivers, but it should be understood that fewer or greater caregivers may also complete the various processes described with respect to the method 600 without departing from the scope of the present disclosure. While method 600 describes the subject being rotated from a supine position to a prone position, the subject may also be rotated from a prone position to a supine position using a method similar to method 600. Further, it should be understood that rotation may be achieved with the bladders fully inflated, fully deflated, partially inflated, or partially deflated. For example, to assist with the rotation process, not all bladders may be fully inflated. The bladders on one side of the subject may be inflated, or inflated more bladders on the other side, to raise the subject in the direction of rotation to begin the rotation process as described herein.

At block 602, one or more bladders may be inserted into one or more cavities of the inflatable support strap 500. As described above, the body 502 of the inflatable support strap 500 may have a cavity 505 defined by a first major surface 562 and a second major surface 564. The first major surface 562 and the second major surface 564 may be separated to access the cavity 505. Once the cavity 505 is accessed, one or more bladders may be inserted into the cavity 505. Once the bladders have been inserted into the cavity 505, the fasteners 503 on the first major surface 562 and the second major surface 564 may be fastened to secure the bladders to the body 502 of the inflatable support strap 500. In some embodiments, the bladder may be integrated into the inflatable support strap. In which case, the caregivers do not need to add a bladder to the inflatable support strap 500 and may alternatively verify the integrity of the strap, if previously used.

In some embodiments, the inflatable support strap may have multiple cavities. In addition to the first major surface 562 and a second major surface 564, cavities may be further defined by dividers. The inflatable support strap 500 may be configured to have one or more cavities. Each of the one or more cavities may be configured to have one or more bladders. Each of the one or more cavities may have one or more fasteners for securing the bladder in place. Although the one or more cavities may have one or more bladders, the inflatable support strap 500 may receive one or more bladders in some of the cavities but not others. Some cavities may be configured to create passages through the inflatable support strap 500 for items such as tubes, wires, body parts, and the like. In some embodiments, block 602 may be omitted to perform rotation without the bladders. In other embodiments, block 602 may occur at any other point during method 600.

At block 604, the caregivers may determine a direction of rotation from a first orientation. The direction of rotation reflects the side of a support surface 104 to which the subject 102 will be turned. The side of the support surface 104 to which the subject 102 will be turned (e.g., the left side of the support surface 104 or the right side of the support surface 104) dictates the positioning of the inflatable support straps 500.

Factors to consider in deciding which direction to rotate that subject 102 may include the position of the support surface 104 and the comfort of the subject 102. Other factors to consider may include the medical equipment in use by the subject 102 such as, for example, tubing, leads, lines, braces, and/or the like. For example, a subject 102 in need of breathing assistance may have a tracheostomy tube inserted in their airway for connection to a ventilator. In another example, a subject 102 being monitored for heart and/or brain activity may have a plurality of leads attached to their skin. Subjects 102 incapable of eating or drinking may have a central venous catheter fluidly coupled via tubing to an IV fluid source. Such subjects 102 must be carefully rotated to ensure the tubing, leads, lines, braces, and/or the like do not become dislodged, kinked, disconnected, cause injury, and/or the like.

If medical equipment obstructs both directions of rotation, the various tubing, leads, lines, braces, and/or the like may be adjusted. In some embodiments, the tubing, leads, lines, braces, and/or the like may be adjusted by temporarily removing the tubing, leads, lines, braces, and/or the like for the duration of the rotation process. In some embodiments, particularly embodiments where the tubing, leads, lines, braces, and/or the like cannot or should not be removed, the tubing, leads, lines, braces, and/or the like may be moved to a position where they will not hinder rotation of the subject 102 and/or to a position where they will not or are less likely to become dislodged, kinked, disconnected, cause injury, and/or the like.

At block 606, at least one inflatable support strap 500 may be arranged under the subject 102 to extend in a lateral direction underneath the subject 102. The inflatable support straps 500 may include a first end extending laterally toward the direction of rotation and a second end extending laterally toward the direction opposite the direction of rotation, the second end comprising at least one loop. One or more inflatable support straps 500 may be arranged under the subject 102 by sliding the inflatable support straps 500 under the subject 102, pushing the inflatable support straps 500 under the subject 102 and towards the opposite side of the subject 102, and pulling the inflatable support straps 500 on the opposite side. In some embodiments, the inflatable support straps 500 may be pre-placed on the support surface 104 prior to the subject 102 being placed on the support surface 104. In such embodiments, the subject 102 and/or the inflatable support straps 500 may be arranged for positioning, as described herein. It should be understood that the subject 102 may further be positioned with respect to the inflatable support straps 500 based on the various features of the inflatable support straps 500 discussed herein with respect to FIGS. 5A-5E. For example, the subject 102 may be aligned with various markers 552 in some embodiments.

Figure 7A:
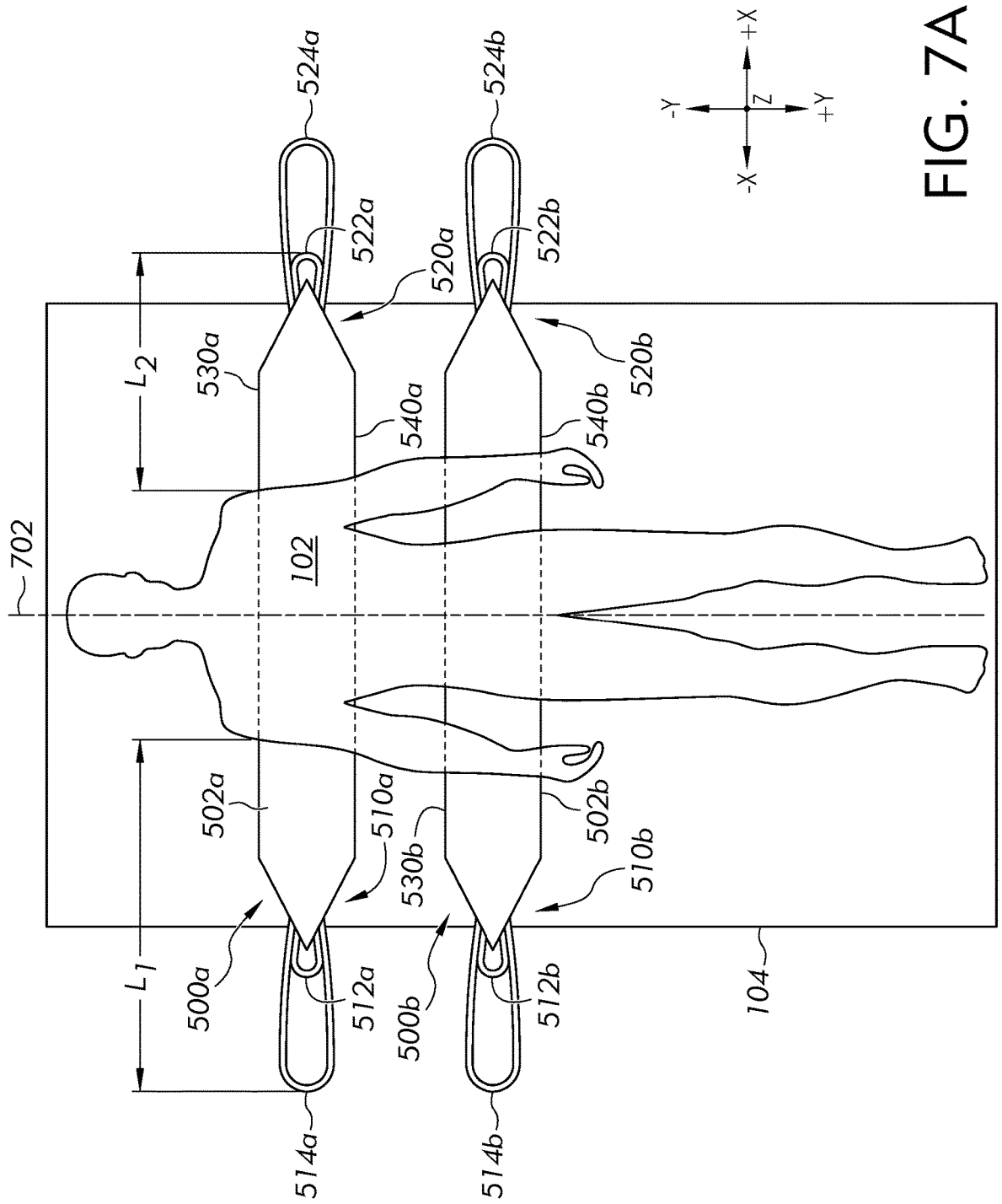
FIG. 7A schematically depicts an illustrative step of positioning a subject relative to a plurality of inflatable support straps, according to one or more embodiments shown and described herein.
Figure 7B:
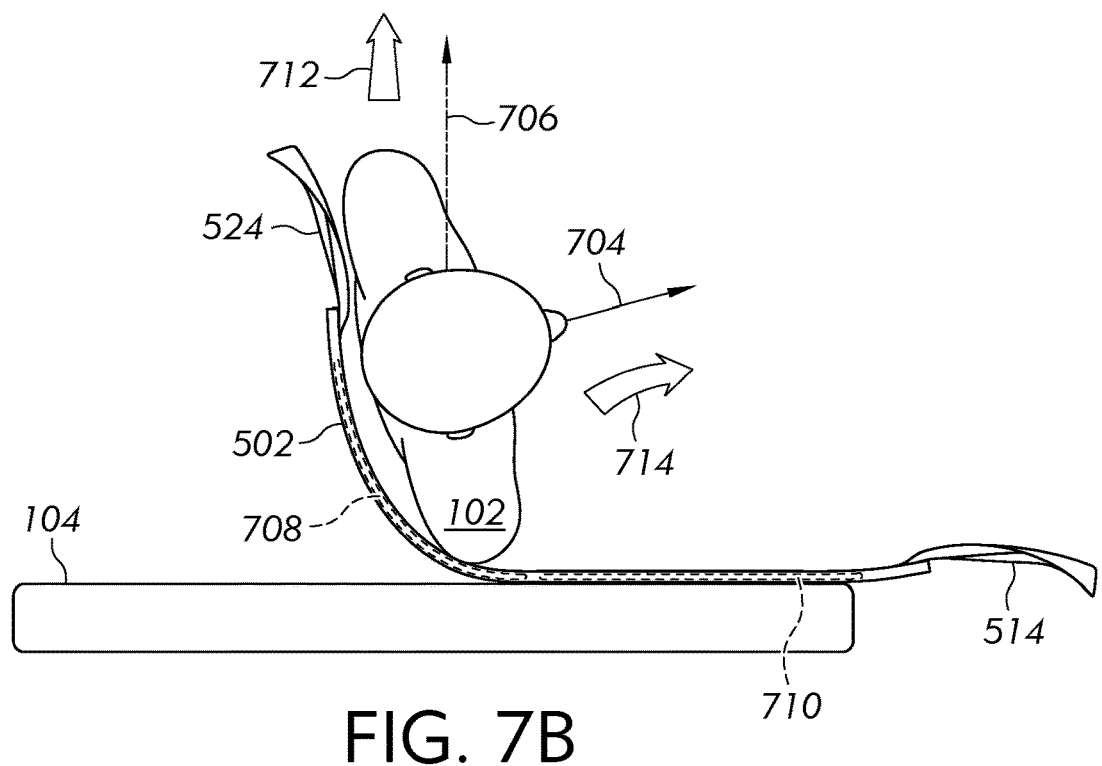
FIG. 7B schematically depicts an illustrative step of raising a side of the plurality of inflatable support straps to begin rotation, according to one or more embodiments shown and described herein.
Figure 7C:
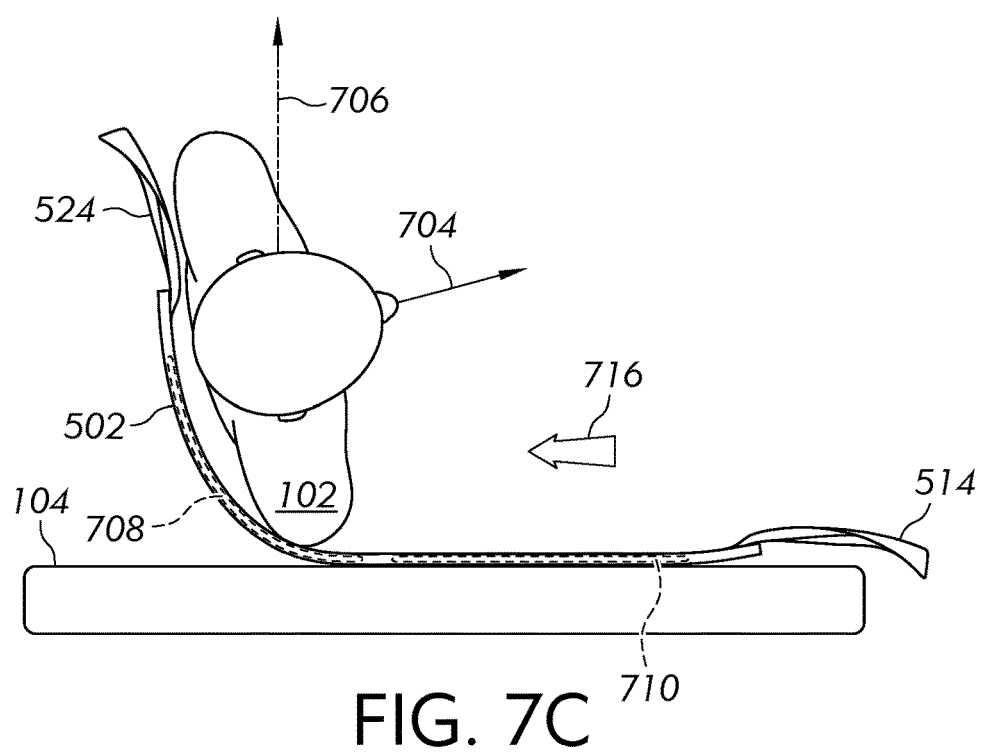
FIG. 7C schematically depicts an illustrative step of repositioning the subject on a surface, according to one or more embodiments shown and described herein.
Figure 7D:
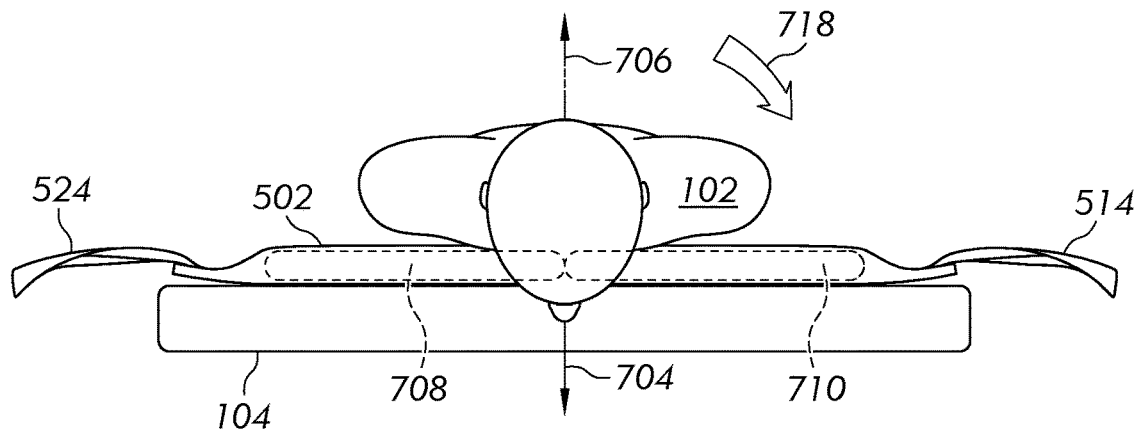
FIG. 7D schematically depicts an illustrative step of completing the rotation by continuing to raise a side of the plurality of inflatable support straps, according to one or more embodiments shown and described herein.

As depicted in FIG. 7A, a first inflatable support strap 500a may be placed such that the first inflatable support strap 500a extends laterally across the subject 102 in a location that is superior relative to a second inflatable support strap 500b (e.g., located in the −y direction) that also extends laterally across the subject 102. More specifically, the first inflatable support strap 500a may be positioned such that the first edge 530a and the second edge 540a of the first inflatable support strap 500a extends in a lateral direction and is positioned at a location that is at or inferior to a shoulder of the subject 102, as depicted in the embodiment of FIG. 7A. In some embodiments, the first edge 530a and/or the second edge 540a of the first inflatable support strap 500a may be positioned longitudinally between a shoulder and an armpit of the subject 102. The second inflatable support strap 500b may be positioned such that the first edge 530b of the second inflatable support strap 500b extends in a lateral direction (e.g., parallel to the first inflatable support strap 500a) and is longitudinally positioned at a location that is at or near a greater trochanter of the subject 102, as depicted in FIG. 7A. In some embodiments, the second inflatable support strap 500b may be positioned such that the first edge 530b of the second inflatable support strap 500b and the second edge 540b of the second inflatable support strap 500b are longitudinally located between a waist of the subject 102 and a knee of the subject 102. Additionally, the first inflatable support strap 500a may be positioned such that the first end 510a and the second end 520a of the first inflatable support strap 500a extends in a lateral direction (i.e., −x and +x), as depicted in the embodiment of FIG. 7A.

As also depicted in FIG. 7A, the second inflatable support strap 500b may generally be laterally aligned with the first inflatable support strap 500a. That is, the first end 510b, the first long loop 514b, the second end 520b, and the second long loop 524b of the second inflatable support strap 500b may generally be laterally aligned with the corresponding components of the first inflatable support strap 500a in embodiments where the second inflatable support strap 500b has the same dimensions as the first inflatable support strap 500a.

As further depicted in FIG. 7A, the first inflatable support strap 500a may further be positioned such that the first long loop 514a thereof is located a first length $L_1$ from a widest lateral part of the subject 102 (e.g., an arm of the subject 102, a shoulder of the subject 102, a torso of the subject 102, or the like) in the area where the first inflatable support strap 500a is located with respect to the subject 102. The first inflatable support strap 500a may also be positioned such that the second long loop 524a thereof is located a second length $L_2$ from the widest lateral part of the subject 102 (e.g., an arm of the subject 102, a shoulder of the subject 102, a torso of the subject 102, or the like) in the area where the first inflatable support strap 500a is located. The first length $L_1$ and the second length $L_2$ may be equal. That is, the subject 102 is positioned such that they are centered with the body 502a of the first inflatable support strap 500a and the body 502b of the second inflatable support strap 500b and a midline 702 of the subject 102 is aligned with a centerline of the inflatable support straps 500a, 500b. If an overhead lift is used, the short loops 512, 522 may be used along with the long loops 514, 524. For example, if an overhead lift is used to turn a subject 102 in the +x direction, the short loops 512a, 512b and long loops 524a, 524b may be used. For another example, if an overhead lift is used to turn a subject 102 in the −x direction, the short loops 522a, 522b and long loops 514a, 514b may be used.

In some embodiments, the inflatable support straps 500a, 500b may be positioned such that they are centered with the support surface 104 and the subject 102 is positioned relative to the straps such that the subject 102 is positioned off-center with the body 502a of the first inflatable support strap 500a and the body 502b of the second inflatable support strap 500b and a midline 702 of the subject 102 is off-center from a centerline of the inflatable support straps 500a, 500b in a direction that is opposite the direction of rotation. The first length $L_1$ and second length $L_2$ are generally not limited by the present disclosure, and may each be any length.

Referring again to FIG. 6, at block 608, the second end of the inflatable support straps 500 may be raised to begin rotation towards the direction of rotation. The one end of the inflatable support straps 500 may be raised by a second long loop 524 on an end of the inflatable support straps 500. For example, each strap may have a caregiver assigned to raise the second long loop 524 at the end of the inflatable support strap 500. The second long loop 524 of the inflatable support straps 500 may be raised until tension exists in the second long loop 524 and the subject 102 begins to be rotated off of the support surface 104 in the direction of rotation. For example, in FIG. 7B, the subject 102 may be initially positioned facing a first direction 706. The second long loop 524 of inflatable support strap 500 may be raised in a direction as indicated by arrow 712 thereby causing the subject 102 to rotate in a direction as indicated by arrow 714. The rotation causes the subject 102 to then face a second direction 704.

In some embodiments, the other end of the inflatable support strap 500 may be raised by lifting the first long loop 514 to provide additional stability and to ensure the rotation is performed in a controlled fashion, if enough caregivers are available. In some embodiments, the body 502 of the inflatable support straps 500 may include cut out portions 558 for the subject 102 to hold during rotation for further stability and control in the rotation, as shown in FIG. 5B and FIG. 5C.

Referring still to FIG. 6, at block 610, the subject 102 may be repositioned with respect to the support surface 104 when the subject 102 has rotated to a lateral recumbent position (e.g., a side-lying position). After initiating rotation of the subject 102, the subject 102 may become closer to the edge of the support surface 104 in the direction of rotation. In some instances, the subject 102 may be so close to the edge of the support surface 104 that the subject 102 may fall off the support surface 104 if the rotation were to be completed. In such instances, the subject 102 may need to be repositioned to allow for safe completion of rotation. The subject 102 may be repositioned by moving the inflatable support straps 500 and the subject 102 laterally in a direction opposite the direction of rotation. For example, in FIG. 7C, the subject 102 was repositioned to be centered on the support surface 104 by moving the subject 102 in a direction indicated by arrow 716.

In some embodiments, additional caregivers may provide the force for repositioning the subject 102 while the other caregivers raise the second long loops 524 of the inflatable support straps 500 for rotation. In some embodiments, the body 502 of the inflatable support straps 500 may have a low friction construction and/or coating on a major surface, as shown in FIG. 5D, in contact with the support surface 104 to reduce the effort needed to reposition the subject 102.

At block 612, the raised end of the inflatable support strap 500 may continue to be raised to cause the subject 102 to continue rotating to a second orientation that is about 180° from the first orientation. The raised end of the inflatable support straps 500 may continue to be raised by the second long loop 524 on the end of the inflatable support straps 500. The second long loop 524 may be raised in a direction sufficient to complete the rotation of the subject 102. The rotation of the subject 102 is be completed once the subject 102 is facing in a second direction 704 that is substantially the opposite of the first direction 706 that the subject 102 was facing. Once the rotation of the subject 102 is completed, the second long loop 524 of the end of the inflatable support strap 500 may be returned to its original position on the support surface 104. For example, in FIG. 7D, the rotation of the subject 102 is continued in a direction as indicated by arrow 718 such that the subject 102 is facing the support surface 104.

In some embodiments, the inflatable support straps 500 may also be repositioned such that they are centered underneath the subject 102. The body 502 of the inflatable support straps 500 may have a low friction construction and/or coating on a major surface, as shown in FIG. 5D, in contact with the support surface 104 to reduce the effort needed to reposition the inflatable support straps 500. In other embodiments, the inflatable support straps 500 may be repositioned such that particular bladders are located in particular locations relative to the subject.

At block 614, it is determined whether the subject 102 needs clearance. Clearance may be provided to relieve interface pressure on the body of the subject 102 by reducing the amount of contact that the subject 102 has with the support surface 104. Clearance may also be provided to give space for medical equipment in use by the subject 102 such as, for example, tubing, leads, lines, braces, and/or the like. For example, a subject 102 in need of breathing assistance may have a tracheostomy tube inserted in their airway for connection to a ventilator. In another example, a subject 102 with significantly limited mobility may have a urinary catheter in place, which may need pelvis clearance to avoid pressure on the catheter. If clearance is not needed, the method 600 may proceed to block 622, where the need for position adjustment may be determined. If clearance is needed, then the process may proceed to block 616.

At block 616, the inflatable support strap 500 may be inflated to reduce contact between the subject and the support surface. The inflatable support strap 500 may be inflated with a fluid, such as air. The inflatable support strap 500 may be inflated by a fluid pump in fluid communication with the one or more bladders of the inflatable support strap 500. The fluid pump may include, for example, a blower, a mattress air system, a compressed air canister, or any other device or system that is adapted for providing a fluid. Stability of the subject 102 on the inflatable support straps 500 when inflated may be enhanced by utilizing a bladder design of FIGS. 3A-4C, and/or a high-friction material (e.g., FIG. 5D). Once the inflatable support strap 500 is inflated, the method 600 may proceed to block 624.

Figure 7E:
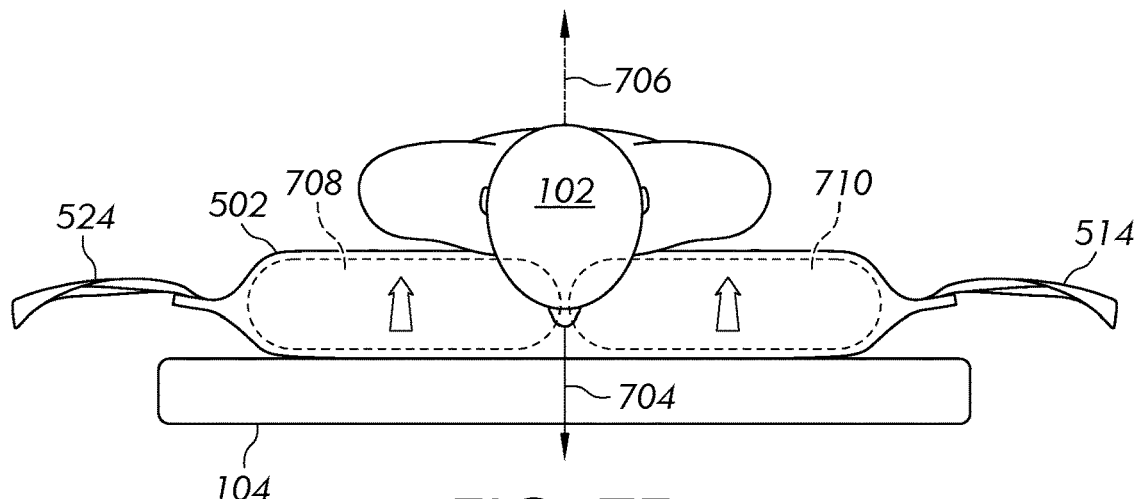
FIG. 7E schematically depicts an illustrative step of inflating the inflatable support straps to provide clearance, according to one or more embodiments shown and described herein.

For example, FIG. 7E depicts an example situation where clearance is needed, at block 614, and so the inflatable support strap 500 is inflated, at block 616. Inflatable support strap 500 may contain two bladders 708, 710 integrated therein. The bladders 708, 710 may be fluidly connected to a fluid pump for inflation. The fluid pumps may fill the bladders 708, 710 with a fluid, thereby causing the inflatable support strap 500 to inflate. The inflation of the inflatable support strap 500 further causes the subject 102 to be lifted a distance from the support surface 104. This lifting reduces the amount of contact that the subject 102 has with the support surface 104, in turn reducing the potential for contact injuries with the support surface 104, reducing pressure on medical equipment in use by the subject 102, or the like.

At blocks 622, 624, it is determined whether the subject 102 needs a position adjustment. A subject 102 may need to be rotated and/or clearance may need to be provided to change the area of contact and/or shift the amount of contact of the body with the support surface 104. Similarly, the inflatable support straps 500 may be adjusted to provide a slight rotation to the subject 102 to allow for an alteration of pressures on different parts of the subject 102. This feature is similar to a low pressure redistribution embedded on a therapeutic surface. However, this feature is unlike such a therapeutic surface because this feature is integrated into a support strap where the slight rotation is only one among several means for alternating pressures on a subject 102. The bladders of the inflatable support straps 500 may be continuously inflated and deflated to provide a surface that alleviates issues related to constant pressure on a particular area of the subject 102.

If position adjustment is needed at block 622, the method 600 may move to block 624, where the one or more bladders of the inflatable support strap 500 may be selectively inflated. Additionally or alternatively, the one or more bladders of the inflatable support strap 500 may have one or more welded portions that define a plurality of cavities that are individually inflatable. If the bladders 708, 710 are integrated into the body 502 of the inflatable support strap 500, the body 502 may have one or more welded portions corresponding to the one or more welded portions of the one or more bladders 708, 710 that define the plurality of cavities within the one or more bladders 708, 710. One or more of the plurality of cavities and/or plurality of bladders may be inflated to selectively inflate the inflatable support strap 500, thereby causing a side of the inflatable support strap 500 to partially lift the subject 102. Inflation to the one or more bladders may be performed in a manner similar to block 616.

For example, if position adjustment is needed at block 622, one or more bladders of the inflatable support strap 500 may be selectively inflated. Referring to FIG. 7E, instead of inflating both the left bladder 708 and the right bladder 710, as depicted, only one of the left bladder 708 or the right bladder 710 may be inflated at block 624. Alternatively, one bladder may be inflated more than the other bladder. The result is that the subject 102 is positioned such that the is facing a direction 704 that is not opposite the first direction 706 from the support surface 104.

If position adjustment is desired at block 618, the method 600 may move to block 620, where the one or more bladders of the inflatable support strap 500 may be selectively deflated. Additionally or alternatively, the one or more bladders of the inflatable support strap 500 may have a plurality of cavities distributed along the lateral length of the subject 102. One or more of the plurality of cavities may be deflated to selectively deflate the inflatable support strap 500, thereby causing a side of the inflatable support strap 500 to provide a slight rotation of the subject 102 and distribute the weight of the subject 102 towards the direction of the slight rotation.

Figure 7F:
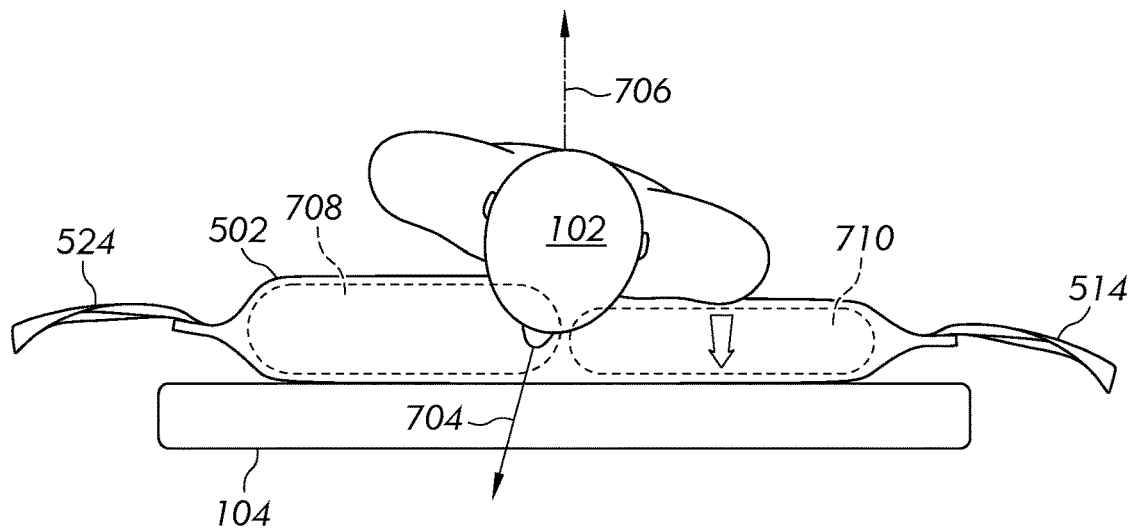
FIG. 7F schematically depicts an illustrative step of deflating a portion of the inflatable support straps to provide a slight rotation, according to one or more embodiments shown and described herein.

For example, FIG. 7F depicts an example situation where a position adjustment is needed, at block 618, and so the inflatable support strap 500 is partially deflated, at block 620. Inflatable support strap 500 may contain two bladders 708, 710 integrated therein. The bladders 708, 710 may contain a valve coupled to an interior of the bladders 708, 710 for fluidly connecting the bladders 708, 710 to a fluid pump. The valve may be used to release fluid from either or both of the bladders 708, 710. Here, bladder 710 has fluid being released, thereby causing the bladder 710 to deflate, as indicated by the arrow pointing towards the support surface 104. The partial deflation of bladder 710 causes the left side of the subject 102 to move towards the support surface 104 along with the bladder 710. This can be seen in FIG. 7F in the second direction 704 the subject 102 is facing, where the second direction 704 is no longer directly opposite the in the first direction 706 the subject 102 was initially facing. In some embodiments, the two bladders 708 and 710 may be cavities defined by a welding in a single bladder.

In some embodiments, the inflatable support strap 500, and the various features described herein with respect to FIGS. 2A-2C, 3A-3C, 4A-4C, and 5A-5E may be included in various kits of parts. For example, a kit of parts may include at least one inflatable support strap 500 and one or more instructions for positioning the inflatable support strap with respect to a subject, such as instructions that correspond to the various processes described herein with respect to FIGS. 6 and 7A-7F. In some embodiments, the kit of parts may additionally or alternatively include one or more instructions for inserting and arranging the one or more bladders within the cavity of the inflatable support strap, such as instructions for particularly dividing the cavity, selecting bladders, and placing bladders to achieve a particular use, as described herein. Additionally, in some embodiments, the kit of parts may additionally or alternatively include at least one pump and one or more instructions for inflating the inflatable support strap using the at least one pump.

It should now be understood that the present disclosure relates to various inflatable support straps that may contain one or more bladders for the purposes of rotating a subject, providing clearance between the subject and a support surface, and providing position adjustments without having to rotate the subject. The various inflatable support straps described herein include features that aid in providing the inflatable support strap with a bladder for inflation, aid in reducing sliding of the subject on an inflated support strap, aid in positioning a subject with respect to the inflatable support strap, aid in holding or moving the inflatable support strap with respect to the subject, aid in spacing the inflatable support straps with respect to one another, and/or the like.

It is noted that the terms "substantially" and "about" may be utilized herein to represent the inherent degree of uncertainty that may be attributed to any quantitative comparison, value, measurement, or other representation. These terms are also utilized herein to represent the degree to which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An inflatable support strap for positioning and rotating a horizontally laying subject on a support surface, the inflatable support strap comprising:
   an elongate body comprising a first end and a second end spaced a distance apart from the first end along a longitudinal direction, the first end and the second end each comprising at least one loop extending therefrom, the elongate body defining a cavity, and the elongate body configured to be positioned at or near a chest area or a waist area of a subject such that the longitudinal direction is transverse to the chest area or the waist area; and
   one or more bladders disposed within the cavity, the one or more bladders configured to be selectively inflated or deflated.

2. The inflatable support strap of claim 1, wherein each of the one or more bladders comprises at least one valve fluidly coupled to an interior of the one or more bladders.

3. The inflatable support strap of claim 1, wherein each of the one or more bladders comprises one or more welded portions that define a plurality of cavities within the one or more bladders that are individually inflatable.

4. The inflatable support strap of claim 1, wherein each of the one or more bladders further comprises a laterally extending welded portion for reducing curvature of the one or more bladders.

5. The inflatable support strap of claim 1, wherein the one or more bladders further comprises a plurality of welded points for reducing curvature of the one or more bladders.

6. The inflatable support strap of claim 1, wherein each of the one or more bladders comprises at least one fastener for securing the one or more bladders to the elongate body.

7. The inflatable support strap of claim 1, wherein the one or more bladders further comprises indicia indicating an arrangement of the one or more bladders with respect to the elongate body.

8. The inflatable support strap of claim 1, wherein the cavity of the elongate body comprises an opening for receiving the one or more bladders therein and a fastener for sealing the cavity.

9. The inflatable support strap of claim 1, wherein the elongate body further comprises at least one slot configured to receive one or more valves of the one or more bladders when positioned within the cavity.

10. The inflatable support strap of claim 1, wherein a surface of the elongate body further comprises a high-friction material.

11. The inflatable support strap of claim 1, wherein a surface of the elongate body further comprises a low-friction material.

12. The inflatable support strap of claim 1, wherein the at least one loop comprises a long loop and a short loop, the long loop being longer in overall length than the short loop.

13. The inflatable support strap of claim 1, wherein the elongate body further comprises one or more first cut out portions at the first end of the inflatable support strap and one or more second cut out portions at the second end of the inflatable support strap, the one or more first cut out portions and the one or more second cut out portions reinforced and providing a grasping point for positioning the inflatable support strap with respect to the subject.

14. The inflatable support strap of claim 1, wherein the elongate body further comprises indicia disposed on an outer surface thereof.

15. The inflatable support strap of claim 14, wherein the indicia indicates an image of one or more anatomical features to aid in alignment with corresponding anatomical features of the subject.

16. A system for rotating a horizontally laying subject on a support surface, the system comprising:
a first inflatable support strap comprising:
a first elongate body comprising a first end and a second end spaced a distance apart from the first end, the first end and the second end each comprising at least one first loop extending therefrom, the first elongate body defining a first cavity, and
one or more first bladders disposed within the first cavity, the one or more first bladders configured to be selectively inflated or deflated; and
a second inflatable support strap comprising:
a second elongate body comprising a third end and a fourth end spaced a distance apart from the third end, the third end and the fourth end each comprising at least one second loop extending therefrom, the second elongate body defining a second cavity, and
one or more second bladders disposed within the second cavity, the one or more second bladders configured to be selectively inflated or deflated.

17. The system of claim 16, further comprising an overhead lift.

18. A kit of parts, comprising:
an inflatable support strap comprising:
an elongate body comprising a first end and a second end spaced a distance apart from the first end along a longitudinal direction, the first end and the second end each comprising at least one loop extending therefrom, the elongate body defining a cavity, and the elongate body configured to be positioned at or near a chest area or a waist area of a subject such that the longitudinal direction is transverse to the chest area or the waist area, and
one or more bladders disposed within the cavity, the one or more bladders configured to be selectively inflated or deflated; and
one or more instructions for positioning the inflatable support strap with respect to the subject.

19. The kit of parts of claim 18, further comprising
a second inflatable support strap; and
one or more instructions for positioning the second inflatable support strap with respect to the subject.

20. The kit of parts of claim 18, further comprising:
one or more instructions for inserting and arranging the one or more bladders within the cavity of the inflatable support strap.

* * * * *